(12) United States Patent
Morris et al.

(10) Patent No.: US 9,958,079 B2
(45) Date of Patent: May 1, 2018

(54) DEVICE FOR A PLUMBING INSTALLATION

(75) Inventors: Peter John Morris, Canning Vale (AU); Garry Rodney White, South Perth (AU)

(73) Assignee: TRITECK LIMITED, Kowloon (HK)

( * ) Notice: Subject to any disclaimer, the term of this patent is extended or adjusted under 35 U.S.C. 154(b) by 0 days. days.

(21) Appl. No.: 14/350,560

(22) PCT Filed: Sep. 14, 2012

(86) PCT No.: PCT/AU2012/001096
§ 371 (c)(1),
(2), (4) Date: Apr. 8, 2014

(87) PCT Pub. No.: WO2013/049880
PCT Pub. Date: Apr. 11, 2013

(65) Prior Publication Data
US 2014/0299809 A1 Oct. 9, 2014

(30) Foreign Application Priority Data

Oct. 8, 2011 (AU) ................................ 2011904202

(51) Int. Cl.
*F16K 27/00* (2006.01)
*F16K 27/02* (2006.01)
(Continued)

(52) U.S. Cl.
CPC ............ *F16K 27/02* (2013.01); *B21C 37/294* (2013.01); *B21D 26/037* (2013.01); *F16K 27/00* (2013.01);
(Continued)

(58) Field of Classification Search
USPC ...................................................... 137/454.2
See application file for complete search history.

(56) References Cited

U.S. PATENT DOCUMENTS 2,203,868 A * 6/1940 Gray ..................... B21C 37/294
72/355.6
3,211,173 A * 10/1965 Mueller ................ F16K 27/029
137/454.5
(Continued)

FOREIGN PATENT DOCUMENTS

DE 19816244 A1 10/1999
EP 0829666 A2 3/1998
JP 2010107406 A 5/2010

OTHER PUBLICATIONS

Vernet, "CA43 Thermostatic Cartridge—The complete Vernet technology within a single temperature regulation unit," Technical Data, 2 pages.
(Continued)

*Primary Examiner* — John Fox
(74) *Attorney, Agent, or Firm* — Marger Johnson

(57) ABSTRACT

A device for a plumbing installation, the device, for example, may be a valve, such as valve (1), or a fluid flow meter (6), and has a casing (10) that is hydraulically formed from metal tubing so as to have a wall surrounding a void interior. The casing (10) is provided with one or more formations, such as shoulders (64) and (65) and at least one inlet opening (14) and at least one outlet opening (18). A cartridge (12) is at least partly located in the void interior of the casing (10). The cartridge (12) has at least two openings, being a first opening (20) and a second opening (22). Seals (46), (48) and (50) are provided between the casing (10) and the cartridge (12). The cartridge (12) is accommodated in the casing (10) by the one or more formations of the casing (10). The cartridge (12) is provided with the operational components of the device (1). The inlet opening (14) of the casing (10) and the first opening (20) of the cartridge (12) are in fluid communication. Similarly, the second opening (22), of the cartridge (12) and the outlet opening (18) of the casing
(Continued)

(10) are in fluid communication. A fluid flow path is thereby created through the device (1) from the inlet opening (14) of the casing (10), through the cartridge (12), to the outlet opening (18) of the casing (10).

16 Claims, 31 Drawing Sheets

(51) Int. Cl.
  *B21D 26/037* (2011.01)
  *B21C 37/29* (2006.01)
(52) U.S. Cl.
  CPC ...... *Y10T 29/4943* (2015.01); *Y10T 29/49442* (2015.01)

(56) References Cited

U.S. PATENT DOCUMENTS

| | | | | |
|---|---|---|---|---|
| 3,247,862 A * | 4/1966 | Burke | | A62C 4/02 137/318 |
| 3,350,905 A * | 11/1967 | Takashi | | B21C 37/294 72/21.5 |
| 3,681,960 A | 8/1972 | Tadokoro | | |
| 3,827,016 A | 7/1974 | Knapp | | |
| 4,410,003 A * | 10/1983 | Sandling | | F16K 5/0271 137/312 |
| 4,971,097 A * | 11/1990 | Hunley, Jr. | | E03B 9/025 137/218 |
| 5,343,841 A * | 9/1994 | Hattori | | F02B 29/083 123/403 |
| 5,586,749 A | 12/1996 | Conley et al. | | |
| 6,006,431 A | 12/1999 | Dorner et al. | | |
| 6,116,572 A | 9/2000 | Schlattmann et al. | | |
| 6,123,094 A * | 9/2000 | Breda | | F16K 11/0853 137/270 |
| 6,474,363 B1 * | 11/2002 | Stephenson | | F16K 11/207 137/883 |
| 6,484,950 B2 * | 11/2002 | Hirota | | F25B 41/062 137/315.11 |
| 6,574,849 B1 * | 6/2003 | Bohm | | B21C 37/294 29/421.1 |
| 6,814,102 B2 * | 11/2004 | Hess | | F16K 1/44 137/315.09 |
| 7,896,025 B2 * | 3/2011 | Hanson | | E03C 1/04 137/454.6 |

OTHER PUBLICATIONS

RMC, "Primary Temperature Control Valve," Brochure, 2008, 2 pages.
RMC, "High Pressure Expansion Control Valves," Brochure, 2008, 2 pages.
RMC, "EB35 Pressure Reducing Valve," Brochure, 2008, 1 page.
RMC, "EB25 Pressure Reducing Valve," Brochure, 2008, 2 pages.
howstuffworks, "How it's Made: Copper Pipe Connectors," downloaded Feb. 4, 2014 from http://videos.howstuffworks.com/science-channel/36442-how-its-made-copper-pipe-connectors-video.htm, 4 pages.
howstuffworks, "How it's Made: Elbow Copper Pipe Fittings," downloaded Feb. 4, 2014 from http://videos.howstuffworks.com/science-channel/36443-how-its-made-elbow-copper-pipe-fittings-video.htm, 4 pages.
Extended European Search Report for European Patent Application No. 12838146.4, dated Nov. 30, 2015, 7 pages.
First Examination Report issued in Australian Patent Application No. 2016244339, dated Feb. 12, 2018, 4 pages.

* cited by examiner

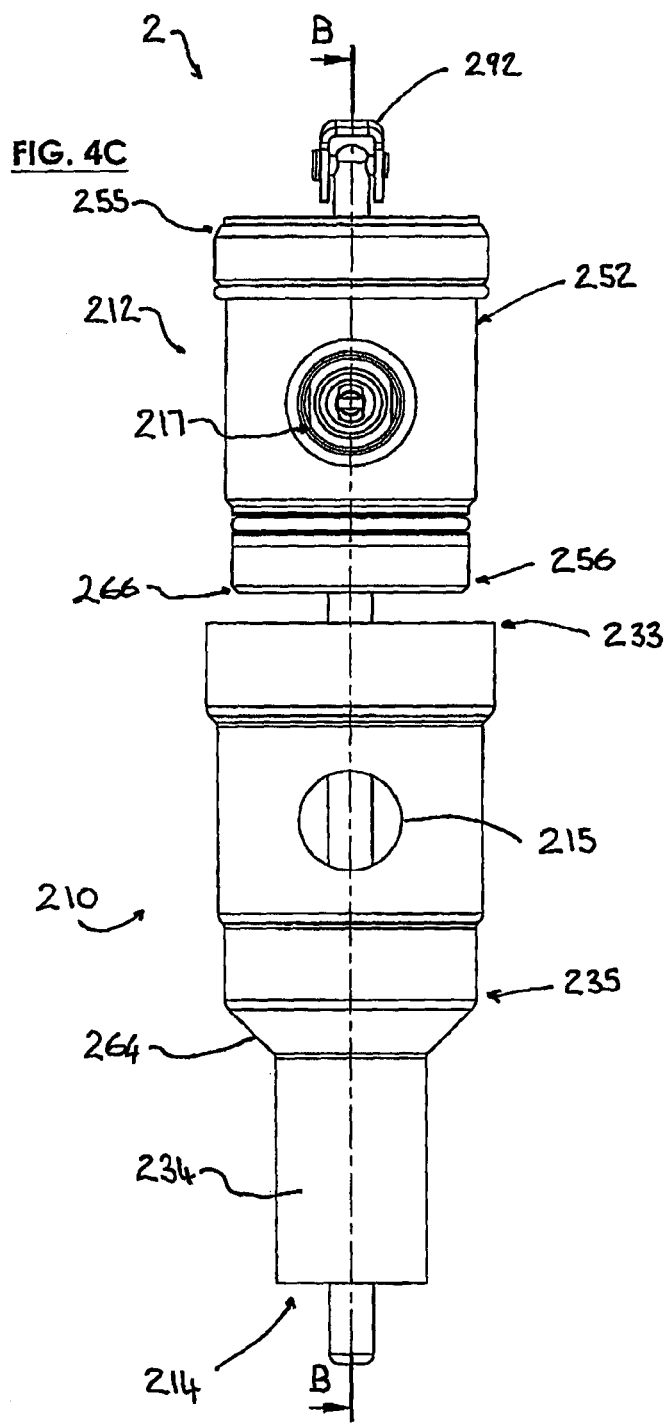

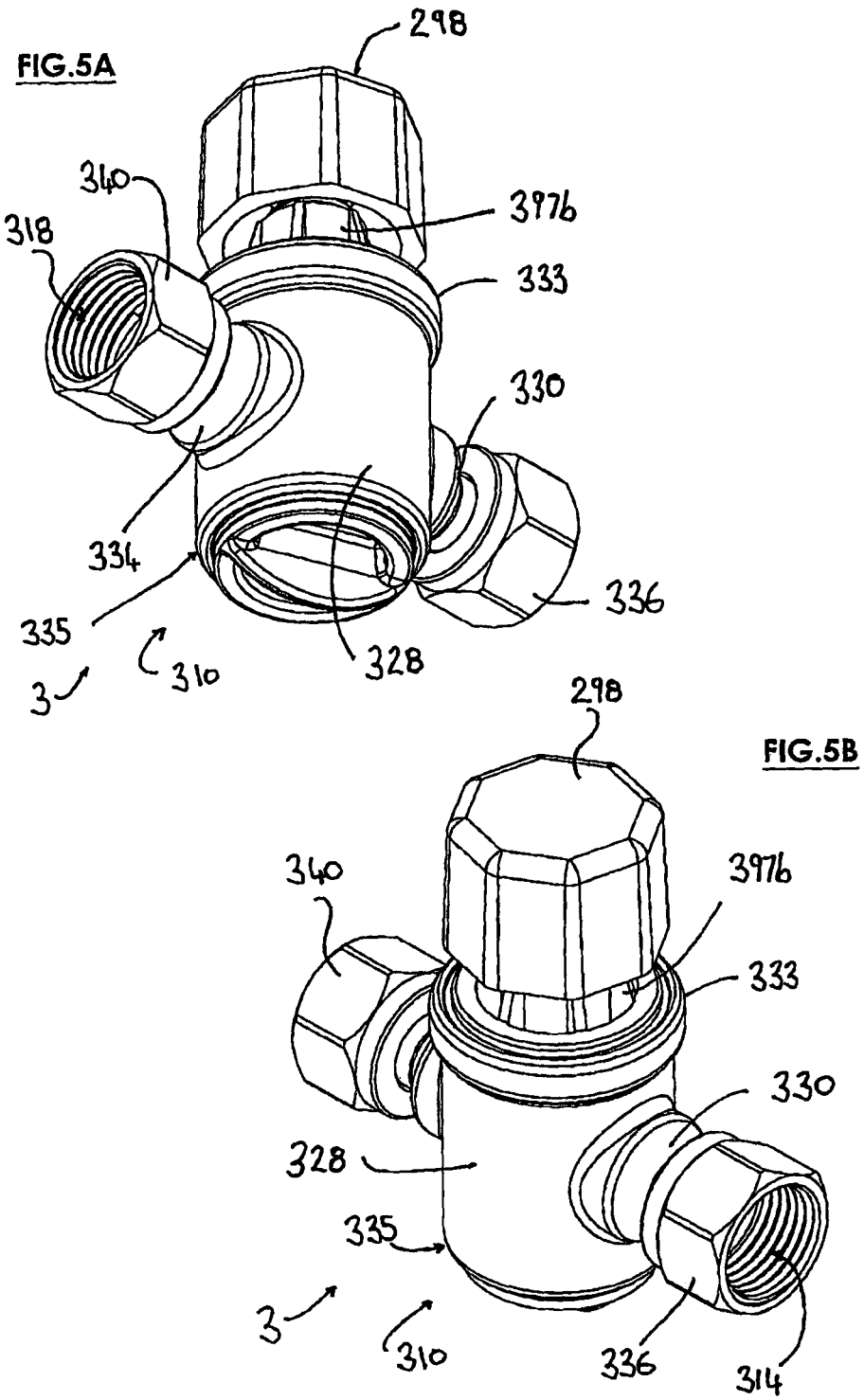

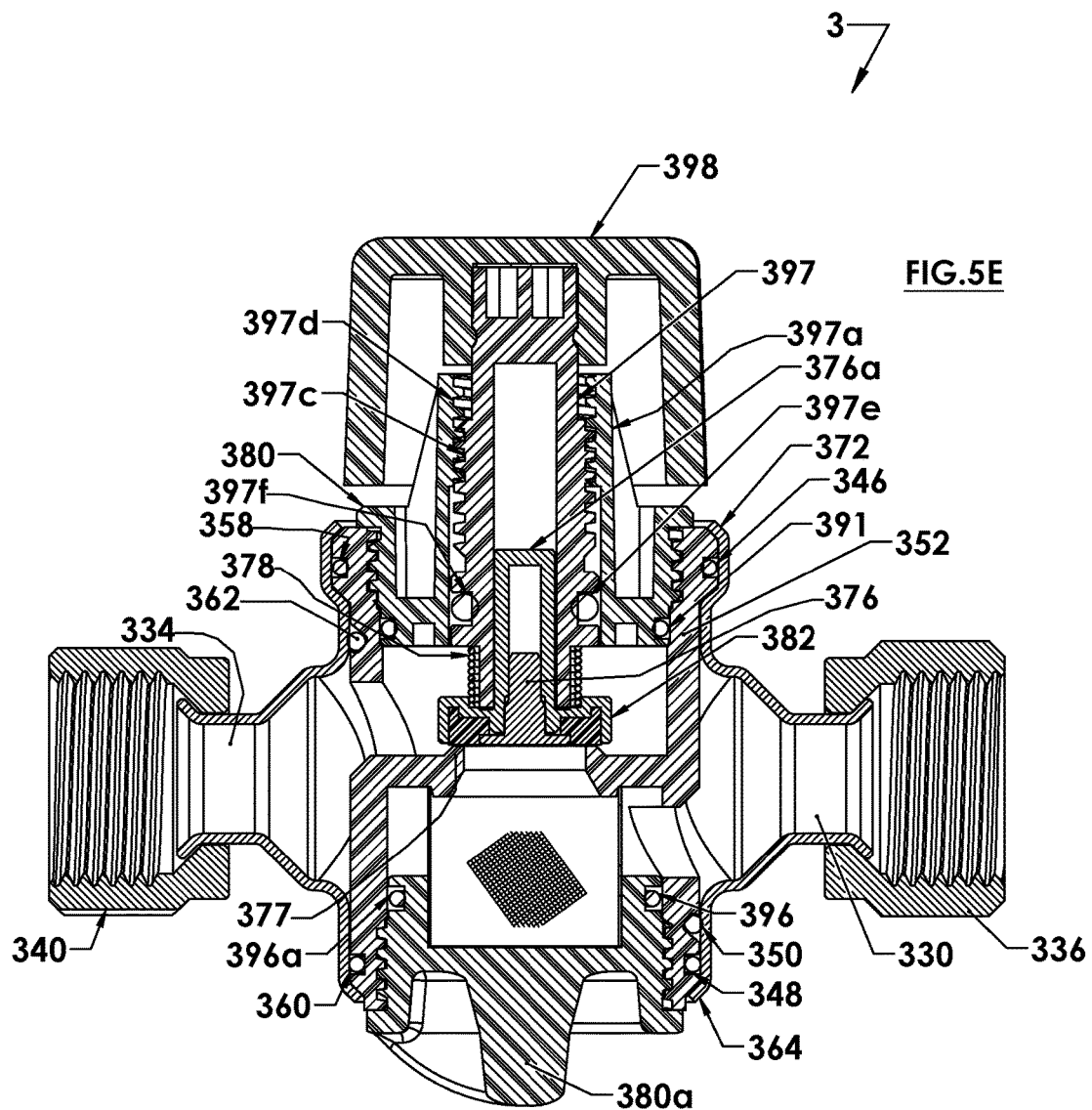

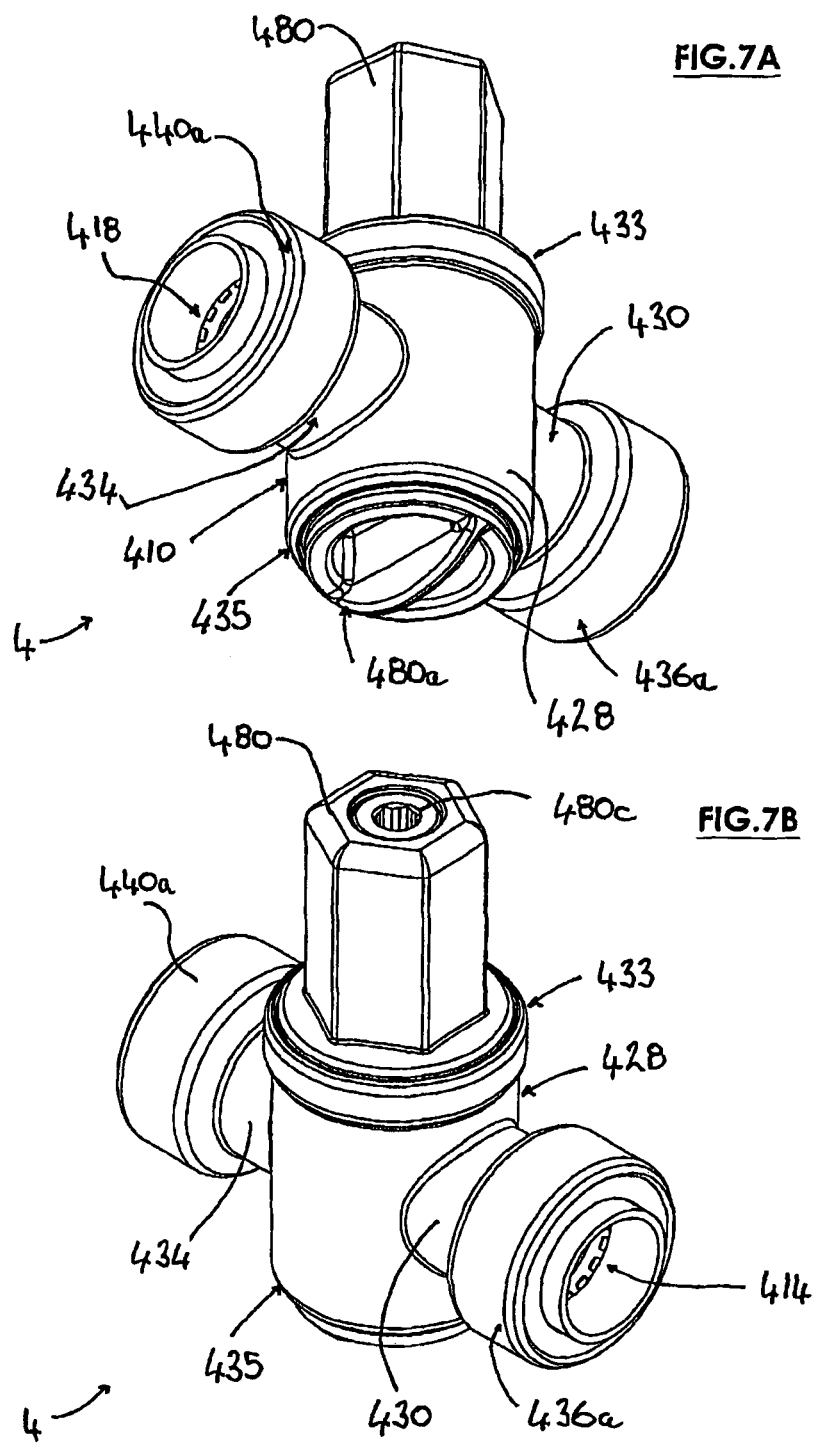

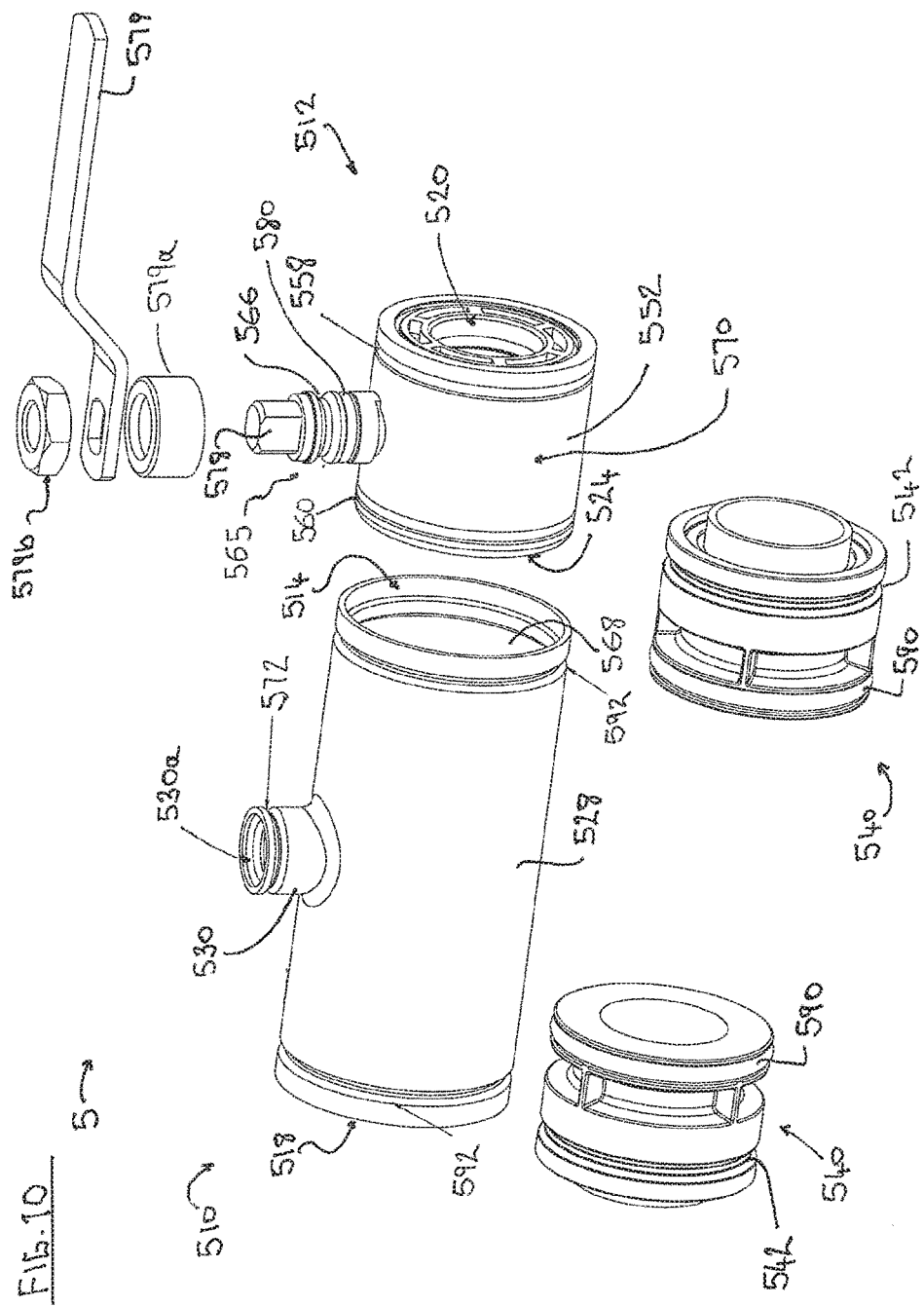

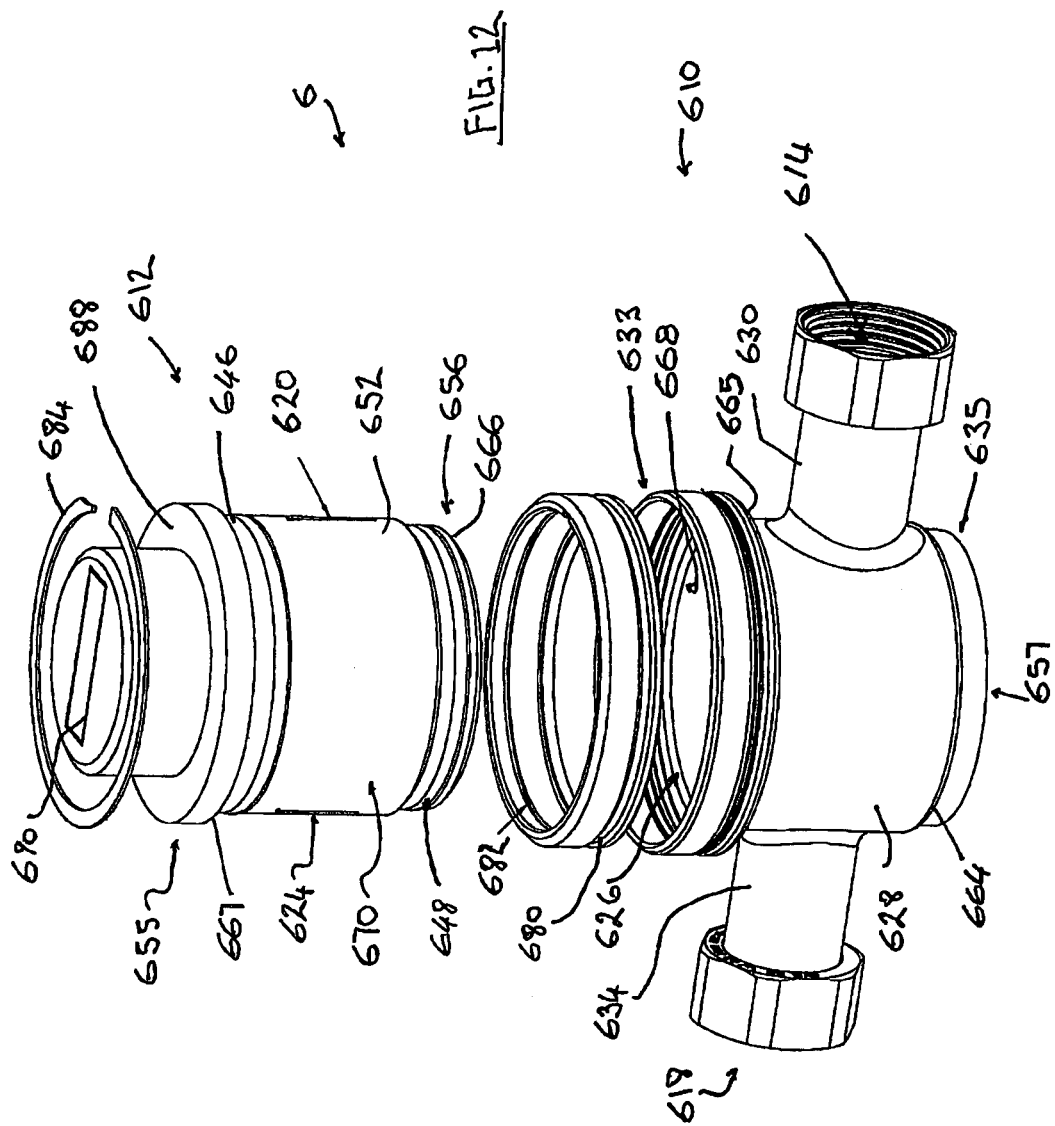

DEVICE FOR A PLUMBING INSTALLATION

INTERPRETATION

The headings in this specification are provided for convenience to assist the reader, and are not to be interpreted so as to narrow or limit the scope of the disclosure in the description, claims, abstract or drawings.

Throughout this specification, unless the context requires otherwise, the word "comprise" and variations such as "comprises", "comprising" and "comprised" are to be understood to imply the presence of a stated integer or group of integers but not the exclusion of any other integer or group of integers.

Throughout this specification, unless the context requires otherwise, the word "include" and variations such as "includes", "including" and "included" are to be understood to imply the presence of a stated integer or group of integers but not the exclusion of any other integer or group of integers.

FIELD OF THE INVENTION

The present invention relates to a device for a plumbing installation, which may alternatively be described as a fluid flow device, and a method of making a device for a plumbing installation or a fluid flow device.

BACKGROUND ART

The discussion of the background art, any reference to a document and any reference to information that is known, which is contained in this specification, is provided only for the purpose of facilitating an understanding of the background art to the present invention, and is not an acknowledgement or admission that any of that material forms part of the common general knowledge in Australia or any other country as at the priority date of the application in relation to which this specification was filed.

Plumbing installations may incorporate different types of devices in the operation of the plumbing installation. Fluid flowing in the plumbing installation passes through these devices. For example, plumbing installations often incorporate valves, which are used to control the flow of fluids in the plumbing installation. A wide range of different types of valves is available to suit the different operating conditions and requirements of plumbing installations. By way of another example, plumbing installations may incorporate flow meters. Flow meters may measure the volume and/or rate of flow of fluid that passes through the flow meter. An example of a commonplace use of a flow meter is a water meter that is used to measure water consumption in domestic, commercial and industrial situations. The relevant water authority levies a charge for the water consumption based on the readings of water usage recorded by the water meter.

Devices, such as valves and flow meters, that are used in plumbing and other like installations typically consist of a cast or forged housing with the operational components of the device retained in the housing. The housing is typically made of brass or bronze. In addition, openings, projections and/or recesses usually have to be provided in the wall internally of the housing during manufacture of the device to accommodate the operational components of the device.

However, the use of metals such as brass and bronze makes these devices relatively heavy and also bulky in size. The need to incorporate the openings, projections and/or recesses in the housing during manufacture adds to the manufacturing steps required and the amount of material required to make the devices. The use of metals such as brass and bronze to make the device housings and the manufacturing steps necessary in the manufacturing processes result in an increase in the manufacturing costs and the end cost to a purchaser.

DISCLOSURE OF THE INVENTION

In accordance with one aspect of the present invention there is provided a device for a plumbing installation comprising
 a casing hydraulically formed from metal tubing to have a wall surrounding a void interior, and the casing provided with one or more formations and at least one inlet opening and at least one outlet opening,
 a cartridge having at least two openings being a first opening and a second opening, and
 seal means provided between the casing and the cartridge, wherein the cartridge is at least partly located in the void interior of the casing and is accommodated by the one or more formations of the casing, and the cartridge is provided with the operational components of the device, and
 the inlet opening of the casing and the first opening of the cartridge are in fluid communication and the second opening of the cartridge and the outlet opening of the casing are in fluid communication, in use, to create a fluid flow path through the device from the inlet opening of the casing, through the cartridge, to the outlet opening of the casing.

Preferably, the one or more formations comprise one or more shoulders with which the cartridge abuts in the casing.

Preferably, the casing is hydraulically formed from the metal tubing to have a main body portion and at least one offset portion extending from the main body portion, the at least one offset portion.

Preferably, the one or more formations comprise one or more openings between the at least one offset portion and the main body portion such that respective void interiors of the at least one offset portion and the main body portion are in communication, and the one or more openings are provided during the hydraulic forming of the metal tubing to form the casing having a main body portion and at least one offset portion extending from the main body portion.

Preferably, the casing is hydraulically formed from the metal tubing to have an access opening such that the cartridge can be inserted into the void interior of the casing at the time of manufacture of the device.

Preferably, retention means is provided to retain the cartridge in the casing.

The retention means, for example, may comprise engagement between the casing and the cartridge.

Alternatively, the retention means may comprise engagement between the casing and a first member that is provided between the casing and the cartridge. This engagement may be by way of at least one rolled formation in the casing that is formed after the casing has been hydraulically formed and the cartridge positioned in the casing. The retention means may further comprise a second member engaging with the cartridge and the first member.

The retention means may comprise a region of the casing, (for example, a region that is adjacent the access opening), being engaged with the cartridge; for example, by being rolled or rolled over to engage with the cartridge. In an alternative arrangement, the retention means may comprise a screw, fastening pin, or similar element engaging with the casing and the cartridge. In a further alternative arrangement, the retention means may comprise a fastening clip (for example, a circlip).

Preferably, the casing is provided with connection means, for example one or more connectors, such that the device may be connected into or to a plumbing installation. The device may be connected to any suitable components of the plumbing installation The cartridge is provided with the operational components of the device in accordance with the type of device. By way of example, in the case of the device being a valve, most types of valves typically have a valve member with a valve head that is able to seat on, and unseat from, a valve seat to close and open the valve, respectively. Particular types of valves in accordance with the present invention such as, for example, a thermostatic mixing valve and a pressure temperature relief valve, will having additional components in the cartridge.

In one embodiment of a valve in accordance with the present invention, the casing is provided with a second inlet opening such that fluid at a first temperature is able to enter the valve through one inlet opening of the casing and fluid at a second temperature is able to enter the valve through the second inlet opening. In this embodiment of a valve, the cartridge is provided with a third opening which is in fluid communication with the second inlet opening of the casing.

Preferably, the cartridge comprises a main part and at least one cap to close off the main part.

In accordance with another aspect of the present invention, there is provided a method of making a device for a plumbing installation comprising hydraulically forming metal tubing to form a casing for the device such that the casing has a wall surrounding a void interior and the casing has an access opening to the void interior, and the casing is further provided with one or more formations and at least one inlet opening and at least one outlet opening, and inserting a cartridge into the casing via the access opening such that the cartridge is at least partly located in the interior of the casing and the cartridge is accommodated by one or more of the formations of the casing, the cartridge having at least two openings being a first opening and a second opening, and the cartridge being provided with the operational components of the device, and wherein the cartridge is inserted into the casing such that the inlet opening of the casing and the first opening of the cartridge are in fluid communication and the second opening of the cartridge and the outlet opening of the casing are in fluid communication, in use, to create a fluid flow path through the device from the inlet opening of the casing, through the cartridge, to the outlet opening of the casing.

Preferably, the method also comprises providing seal means on the exterior of the cartridge prior to inserting the cartridge into the casing.

Preferably, the method further comprises hydraulically forming metal tubing to form a casing such that the wall of the casing has thickness that is less than the thickness of the metal tubing from which the casing was hydraulically formed.

Preferably, the method further comprises providing the casing with at least one inlet opening by removing a closed ending of the casing.

Preferably, the method further comprises providing the casing with at least one outlet opening by removing a closed ending of the casing.

The method may further comprise hydraulically forming the metal tubing to form the casing to thereby provide one or more formations of the casing.

The method may further comprise forming the wall of the casing, after the hydraulic forming of the metal tubing to form the casing, to provide one or more formations of the casing.

The one or more formations may comprise one or more shoulders with which the cartridge abuts in the casing.

Preferably, hydraulically forming metal tubing to form a casing comprises hydraulically forming the metal tubing to form a casing having a main body portion and at least one offset portion extending from the main body portion, the at least one offset portion having a closed ending at its distal end.

Preferably, hydraulically forming the metal tubing to form a casing having a main body portion and at least one offset portion extending from the main body portion comprises providing a said formation in the form of an opening between the at least one offset portion and the main body portion such that respective void interiors of the at least one offset portion and the main body portion are in communication.

Preferably, the one or more formations comprise one or more openings between the at least one offset portion and the main body portion such that respective void interiors of the at least one offset portion and the main body portion are in communication, and the one or more openings are provided during the hydraulic forming of the metal tubing to form the casing having a main body portion and at least one offset portion extending from the main body portion.

Preferably, removing a closed ending of the casing comprises removing the closed ending of an offset portion.

Preferably, the method further comprises retaining the cartridge in the casing.

Retaining the cartridge in the casing may comprise engaging the cartridge with a portion of the casing. This portion of the casing may be adjacent the access opening. Alternatively, it may be adjacent the opening of an offset portion.

In an alternative, retaining the cartridge in the casing may comprise engaging a first member with the casing, the first member being provided between the casing and the cartridge. Engaging a first member with the casing may comprise engaging the first member with a rolled formation in the casing that is formed after the casing has been hydraulically formed and the cartridge positioned in the casing. Retaining the cartridge in the casing may further comprise engaging the cartridge and the first member with a second member.

Preferably, the method further comprises forming the casing without any machining of the wall of the casing inside the void interior of the casing.

Preferably, the method further comprises providing the device with connection means such that the device is connectable to a plumbing installation.

BRIEF DESCRIPTION OF THE DRAWINGS

The present invention will now be described, by way of example only, with reference to the accompanying drawings, in which:

FIG. 4C is a side view of the valve shown in FIG. 4A;

FIG. 5A is a first perspective view of a third embodiment of a device for a plumbing installation, in the form of a valve (being a non-return isolating (NRI) valve), in accordance with an aspect of the present invention;

FIG. 5B is a second perspective view of the valve shown in FIG. 5A;

FIG. 5E is a third cross-sectional front view through the valve shown in FIG. 5A, with the valve in a closed condition;

FIG. 7A is a first perspective view of a fourth embodiment of a device for a plumbing installation, in the form of a valve (being a pressure reducing valve (PRV)), in accordance with an aspect of the present invention;

FIG. 7B is a second perspective view of the valve shown in FIG. 7A;

FIG. 10 is an exploded perspective view of the valve shown in FIG. 9A;

FIG. 12 is an exploded perspective view of the valve shown in FIG. 11A.

BEST MODE(S) FOR CARRYING OUT THE INVENTION

Figure 1B:
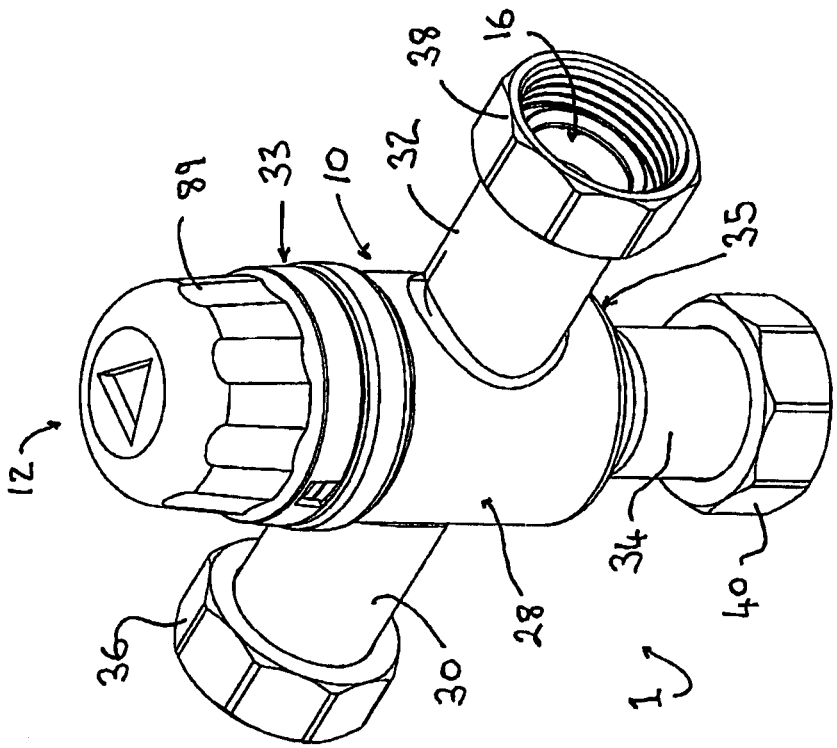
FIG. 1B is a second perspective view of the valve shown in FIG. 1A.
Figure 1A:
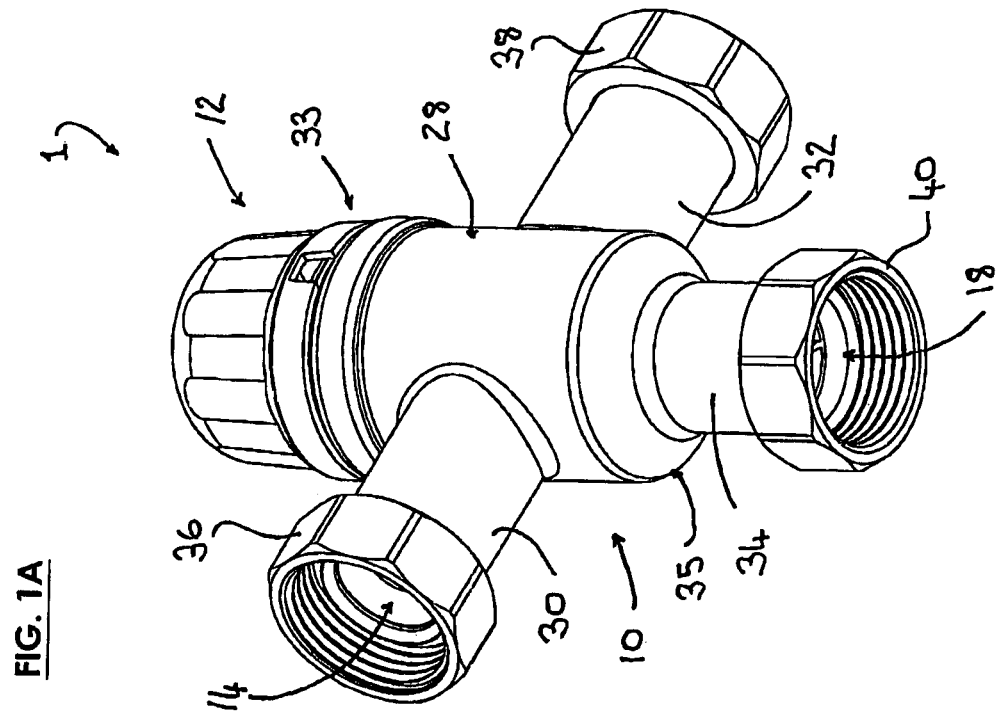
FIG. 1A is a first perspective view of a first embodiment of a device for a plumbing installation, in the form of a valve (being a thermostatic mixing valve), in accordance with one aspect of the present invention.

The device for a plumbing installation, or fluid flow device, in accordance with the present invention comprises a casing and a cartridge that, at least partly, is retained in the casing. The cartridge of each device is provided with the operational components of the device. The casing of each device is made by hydraulically forming a piece of metal tubing. The piece of metal tubing, for example, may be of conventional form, having an opening at each end and a void therebetween. The metal tubing is hydraulically formed into the shape required for the casing for each particular type of device.

In the hydraulic forming of the piece of metal tubing to form the casing for a device in accordance with the present invention, the metal tubing is placed into a mould having the shape required for the casing of the particular device for which the casing is being made. For example, in the case of the device being the thermostatic mixing valve of the first embodiment described herein, it has a casing that is substantially T-shaped.

After the piece of metal tubing has been placed into a mould, a suitable fluid (such as, for example, water) is injected into the tubing at very high pressure. This forces the tubing outwardly to substantially conform to the shape of the mould. The casing is then removed from the mould. The hydraulic forming of the metal tubing forms a casing having a wall surrounding a void interior. The casing has an access opening to the void interior. The access opening is provided by the hydraulic forming of the piece of metal tubing at the opening at one of the ends of the piece of metal tubing from which the casing is formed. Thus, the piece of metal tubing that is hydraulically formed in the mould is a single piece of tubing that forms a casing that is a single, or one piece, casing. This single, or one piece, casing structure can be seen in the drawings of the various embodiments of the device of the present invention that are described herein.

The casing is provided with formations to accommodate the cartridge that is inserted into the void interior of the casing such that the cartridge is at least partly located in the interior of the casing, as will be further described herein.

One or more offset portions of the casing may be formed in the hydraulic forming of the metal tubing that forms the casing. Such offset portions extend from a main body part of the casing. In the hydraulic forming of the piece of metal tubing, most of the material of the piece of metal tubing goes into forming the main body part of the casing. However, depending upon the mould being used, some of the material in the metal tubing is forced into one or more offset parts of the mould to form the offset portion, or portions, of the casing. The main body part and the offset portions are substantially tubular.

One type of the formations to accommodate the cartridge in the casing may provide support for the cartridge in the casing. The cartridge abuts such formations in the casing. These formations may be provided by the hydraulic forming of the metal tubing in the mould to form the casing.

Alternatively, or in addition, formations may be provided by forming the wall of the casing, after the hydraulic forming of the metal tubing to form the casing, to provide one or more formations in the wall of the casing. These formations may be in the form of shoulders in the wall of the casing. The cartridge is provided with one or more complementary surfaces, such as for example complementary shoulders, which respectively abut with one or more of the shoulders inside the casing.

Another type of the formations to accommodate the cartridge in the casing may comprise one or more openings between an offset portion and the main body portion, of the casing, such that respective void interiors of the offset portion and the main body portion are in communication. These openings are created during the hydraulic forming of the piece of metal tubing to form the casing having a main body portion and at least one offset portion extending from the main body portion.

A further type of the formations to accommodate the cartridge in the casing may comprise one or more of the offset portions, as herein before described. An offset portion may accommodate part of the cartridge. For example, part of the cartridge may be located in the offset portion.

The casing is further provided with at least one inlet opening and at least one outlet opening. At least one of the inlet opening or the outlet opening may be created by cutting off a closed end of an offset portion of the casing that is formed by the hydraulic forming of the metal tubing. Depending upon the type of device for which the casing is to be used, one or more such offset portions may be formed by the hydraulic forming of the metal tubing. For example, in the case of the device being the thermostatic mixing valve of the first embodiment, it is provided with two such offset portions, whilst in the case of the device being the pressure temperature relief valve of the second embodiment, it is provided with one such offset portion.

In the case of the metal tubing being of conventional form having an opening at each end, after the hydraulic forming of the metal tubing, the opening at the other end of the tubing (i.e. the opening that is opposed to the opening which provides the access opening) may provide an inlet opening of the casing, an outlet opening of the casing or it may be closed off by the cartridge. Which of these alternatives is applicable to a particular casing depends upon the type of device for which the casing is being made.

In the case of the metal tubing having an opening at one end and the other end being closed, after the hydraulic forming of the metal tubing, the closed end may remain closed or the closed end may be cut off to provide an opening. The closed end is either retained or cut off to provide an opening depending upon the type of device for which the casing is being made.

After the metal tubing has been hydraulically formed to form the casing, one or more sections of the casing may undergo re-sizing or size adjustment. This ensures that the internal and external diameters of the casing, at different sections thereof, are the required size. For example, the internal or external diameter of a section of the casing may be re-sized such that it is connectable with components of a plumbing installation, into which the device, in use, is to be connected. By way of further example, the section of the main body part of the casing that lies adjacent the cartridge may have its internal diameter adjusted such that the cartridge fits in the casing with minimal clearance, as required.

The casing may also undergo additional forming to retain connectors, for example such as nuts and press-fit connectors, with the casing such that the device may be connected to components in a plumbing installation.

The cartridge has at least two openings, being a first opening and a second opening. The cartridge is inserted into the casing such that the inlet opening of the casing and the first opening of the cartridge are in fluid communication and the second opening of the cartridge and the outlet opening of the casing are in fluid communication such that a fluid flow path can be created through the device from the inlet opening of the casing, through the cartridge, to the outlet opening of the casing.

The formations of the casing that comprise one or more openings between an offset portion and the main body portion may accommodate the cartridge in the casing by providing fluid communication between the offset portion and one or more of the at least two openings of the cartridge. In that regard, the cartridge is inserted into the casing such that the one or more openings of the cartridge are aligned with the one or more openings between an offset portion and the main body portion of the casing.

Furthermore, formations of the casing that comprise one or more openings between an offset portion and the main body portion may accommodate the cartridge in the casing whereby part of the cartridge may be provided in an offset portion and another part of the cartridge may be provided in the main body portion of the casing.

The cartridge is retained in the casing by suitable retention means. The retention means ensures that the cartridge is retained in the casing and that the cartridge and the casing are not able to move relative to one another. This, in turn, assists in maintaining the fluid communication between the inlet and outlet openings of the casing and the first and second openings of the cartridge, respectively, as herein before described. The retention means is further described herein with reference to the embodiments.

The cartridge may have some part or parts exterior to the casing. Such part, or parts, for example, may be of a nature that require operation or to which access may be required, e.g. a pressure release lever, pressure adjuster or an open/close mechanism.

The hydraulic forming of the metal tubing to form the casing may result in the wall of the casing having a thickness less than the thickness of the metal tubing. This is because, during the hydraulic forming of the metal tubing, the metal tubing is forced outwardly and the material of the metal tubing forms features of the casing, such as the formations and offsets (with closed ends), which consequently results in the thickness of the wall of the casing being less than the thickness of the metal tubing.

All features of the casing such as, for example, the offset portions and the formations in the wall of the casing, are provided during the hydraulic forming of the piece of metal tubing or by additional forming of the casing after the hydraulic forming of the metal tubing to form the casing. Accordingly, no machining of the wall of the casing inside the void interior of the casing is undertaken after the hydraulic forming of the metal tubing to form the casing. Due to the relative thinness of the wall of the casing, there is insufficient material for machining of features in the wall of the casing to be performed.

Any suitable metal may be used for the metal tubing from which the casing is hydraulically formed. The metal tubing, for example, may be copper tubing or stainless steel tubing.

The embodiments of the device for a plumbing installation, or fluid flow device, in accordance with the present invention, as described herein, include different types of valves and also a fluid flow meter. In that regard, the valve of the first embodiment is a thermostatic mixing valve (TMV), the valve of the second embodiment is a pressure temperature relief (PTR) valve, the valve of the third embodiment is a non-return isolating (NRI) valve, the valve of the fourth embodiment is a pressure reducing valve (PRV), the valve of the fifth embodiment is a ball valve, and the fluid flow meter of the sixth embodiment may be a water meter.

Each of these valves and the fluid flow meter comprises a casing and a cartridge that, at least partly, is retained in the casing. The cartridge of each valve and the fluid flow meter is provided with the operational components of the of the respective valve or fluid flow meter. The casing of each valve or fluid flow meter is made by hydraulically forming a piece of metal tubing. The piece of metal tubing, for example, may be of conventional form, having an opening at each end and a void therebetween. The metal tubing is hydraulically formed into the shape required for the casing for each particular type of valve or the fluid flow meter.

A fluid flow path through the valves of the embodiments described herein is created in the open condition of the valves such that fluid can flow through the valves. A fluid flow path is provided through the fluid flow meter of the embodiment described herein such that the fluid flow meter can measure the fluid flow rate or fluid volume, over time, flowing through the fluid flow meter.

The device according to the present invention is not limited to the five types of valves and the fluid flow meter as described in the embodiments herein. In that regard, the embodiments described herein are provided by way of exemplification of the present invention and the present invention is applicable to other types of devices for a plumbing installation or fluid flow device.

Whilst the references in this specification are to the metal tubing being hydraulically formed to form the casing, liquids other than water may be used to carry out the forming of the metal tubing. Accordingly, "hydraulic" and "hydraulically", as used in this specification, are to be understood to include the use of water or other suitable liquids.

First Embodiment (TMV)—Description

In FIGS. 1A to 1C and FIGS. 2A to 2D, there is shown a first embodiment of a valve 1 in accordance with one aspect of the present invention. The valve 1 shown in these figures is of the thermostatic mixing valve (TMV) type.

The valve 1 comprises a casing 10 and a cartridge 12. The cartridge 12 is partly located in the casing 10. The cartridge 112 is provided with the operational components of the valve 1, as will be described later herein.

The casing 10 has a pair of inlet openings 14 and 16, respectively, and an outlet opening 18. The inlet openings 14 and 16 form the inlet openings for the valve 1, and the outlet opening 18 forms the outlet opening for the valve 1. The cartridge 12 is provided with first and second inlet openings 20 and 22, respectively, and an outlet opening 24.

The inlet opening 14 of the casing 10 is in fluid communication with the first inlet opening 20 of the cartridge 12. The inlet opening 16 of the casing 10 is in fluid communication with the second inlet opening 22 of the cartridge 12. The outlet opening 18 of the casing 10 is in fluid communication with the outlet opening 24 of the cartridge 12.

Figure 2A:
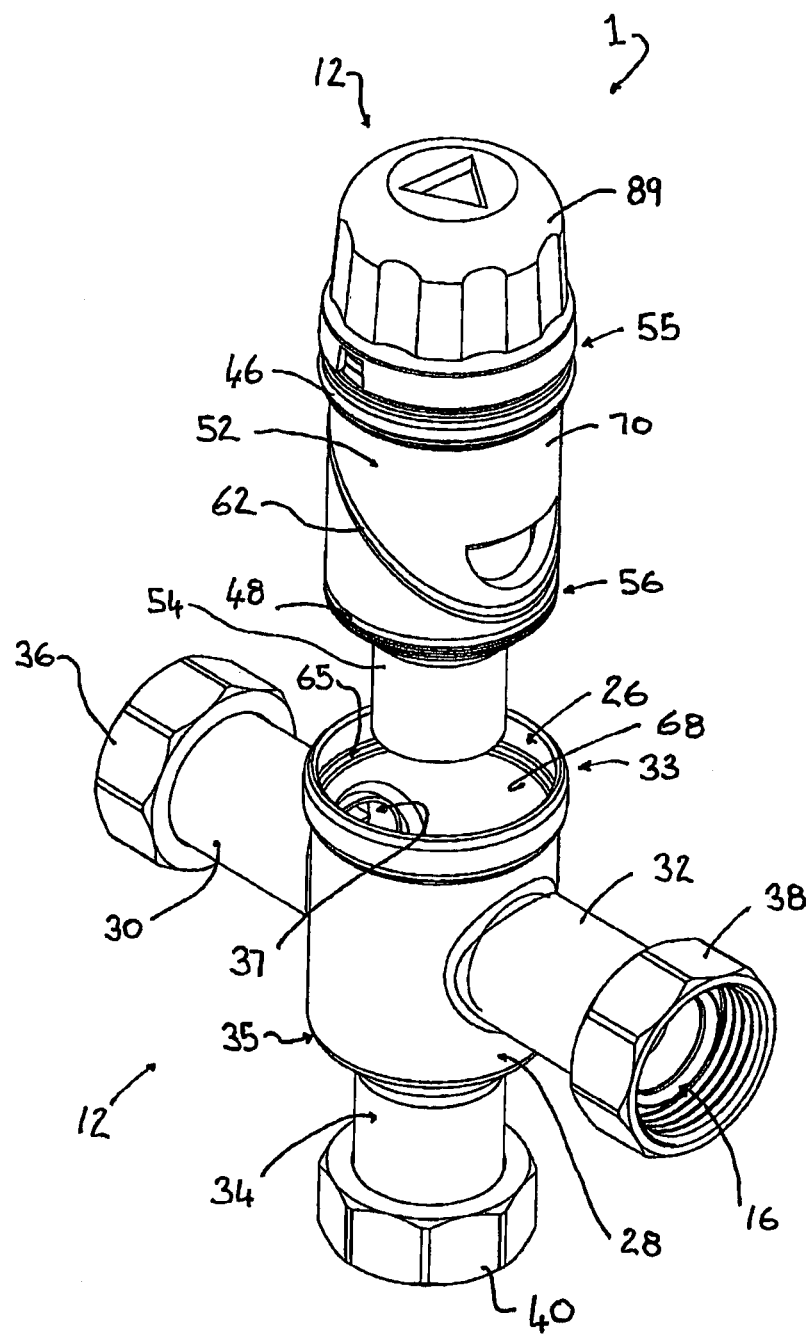
FIG. 2A is an exploded perspective view of the valve shown in FIG. 1A.

The casing 10 has an access opening 26 such that the cartridge 12 can be inserted into the casing 10 at the time of manufacture of the valve 1. The access opening 26 is best seen in FIG. 2A, which is an exploded view of the valve 1 showing the cartridge 12 located outside the casing 10.

The casing 10 comprises a main part, or main body portion, 28 and tubular members 30, 32 and 34. The access opening 26 is provided at a first end 33 of the main part 28 of the casing 10. The tubular members 30 and 32 extend from the main part 28 as offset portions in an arm-like manner and in a diametrically opposed arrangement. The tubular member 34 extends from the other end 35 of the main part 28, which is opposed to the access opening 26. In this way, the casing 10 is substantially T-shaped. The tubular members 30, 32 and 34 are in fluid communication with the main part 28 of the casing 10. The inlet openings 14 and 16 are located at the distal ends of the tubular members 30 and 32, and the outlet opening 18 is located at the distal end of the tubular member 34. The main part 28 of the casing 10 accommodates the cartridge 12.

The casing 10 is provided with formations in the form of respective openings 37 between the main part 28 and the tubular members 30 and 32. An opening 37 is also provided between the main part 28 and the tubular member 34. The respective interiors of the main part 28 and the tubular members 30, 32 and 34 are in communication via the respective openings 37.

The fluid communication of the respective inlet openings of the casing 10 and the cartridge 12 and the respective outlet opening of the casing 10 and the cartridge 12 is achieved by having the first and second inlet openings 20 and 22 positioned near the proximal ends of the tubular members 30 and 32, respectively, and the outlet opening 24 positioned near the distal end of the tubular member 34.

Lock nuts 36, 38 and 40 are provided at the distal ends of the tubular members 30, 32 and 34 that are spaced from the main part 28. The lock nuts 36, 38 and 40 enable the valve 1 to be connected to pipes in a plumbing installation (not shown) having screw threaded components, by way of screw threaded connections.

One-way flow valves, i.e. check valves, 42 and 44 may be provided in the tubular members 30 and 32, respectively. The one-way flow valves 42 and 44 ensure that fluid is able to flow in the tubular members 30 and 32 only in the direction from the inlet openings 14 and 16 to the main part 26. These flow directions are shown by the arrows D and E, respectively, in FIG. 1C.

Seals 46, 48, and 50 are provided between the casing 10 and the cartridge 12. The seal 46 is provided near the access opening 26 of the casing 10. The seal 48 is provided at the region of the end of the main part 28 that is near the tubular member 34. The seal 50 extends around the cartridge 12 such that the respective inlet openings 20 and 22 are isolated from one another by the seal 50. The seal 50 extends around the cartridge 12 in a substantially elliptical manner from a location near the seal 46 to a location near the seal 48. The seals 46, 48 and 5 may be O-rings.

The cartridge 12 comprises a main part, or main body, 52 having respective ends 55 and 56, and a tubular member 54 that extends from the end 56 of the main part 52.

The seals 46, 48 and 50 are located in respective grooves 58, 60 and 62 provided on the exterior of the main part 52 of the cartridge 12. The seals 46 and 48 and their respective grooves 58 and 60 are spaced apart and provided substantially near respective ends 55 and 56 of the main part 52 of the cartridge 12.

The casing 10 is provided with a formation in the form of a shoulder 64 adjacent the end 35 of the main part 28 of the casing 10. The shoulder 64 may taper to the tubular member 34, as best seen in FIG. 1C and FIGS. 2B to 2D. The diameter of the main part 28 is greater than the diameter of the tubular member 34. The casing 10 is provided with another formation in the form of a shoulder 65 near the end 33.

Figure 2B:
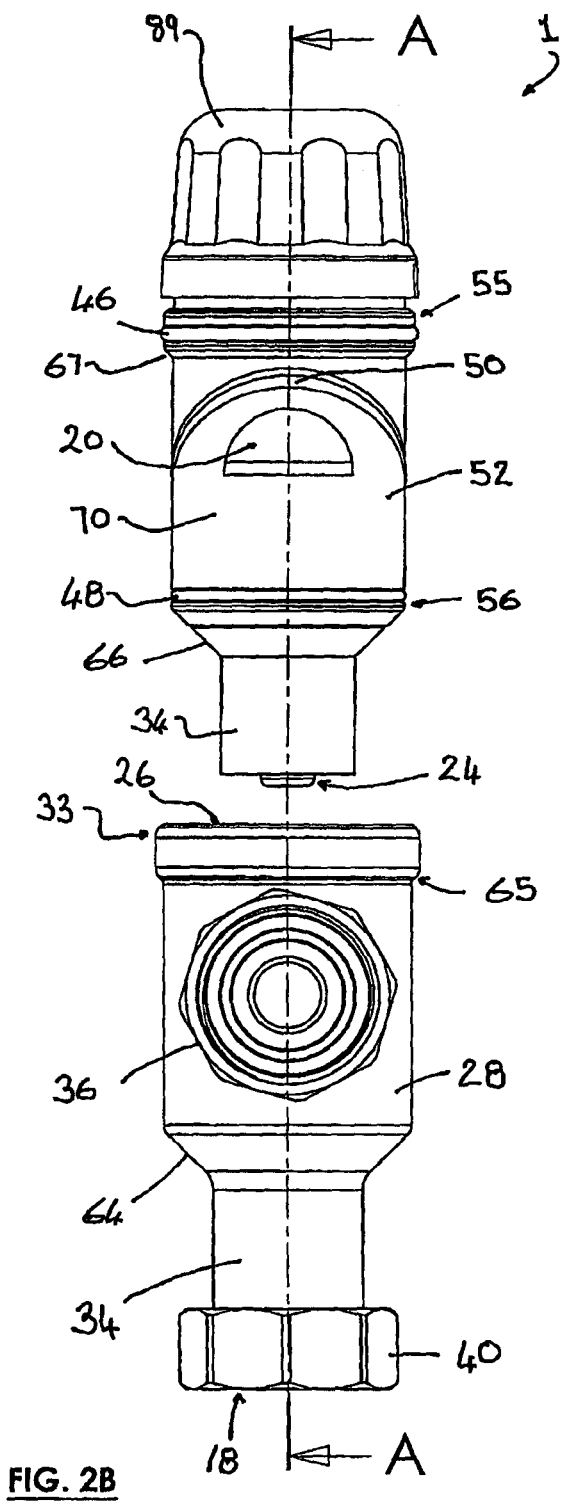
FIG. 2B is a side view of the valve shown in FIG. 2A.
Figure 2C:
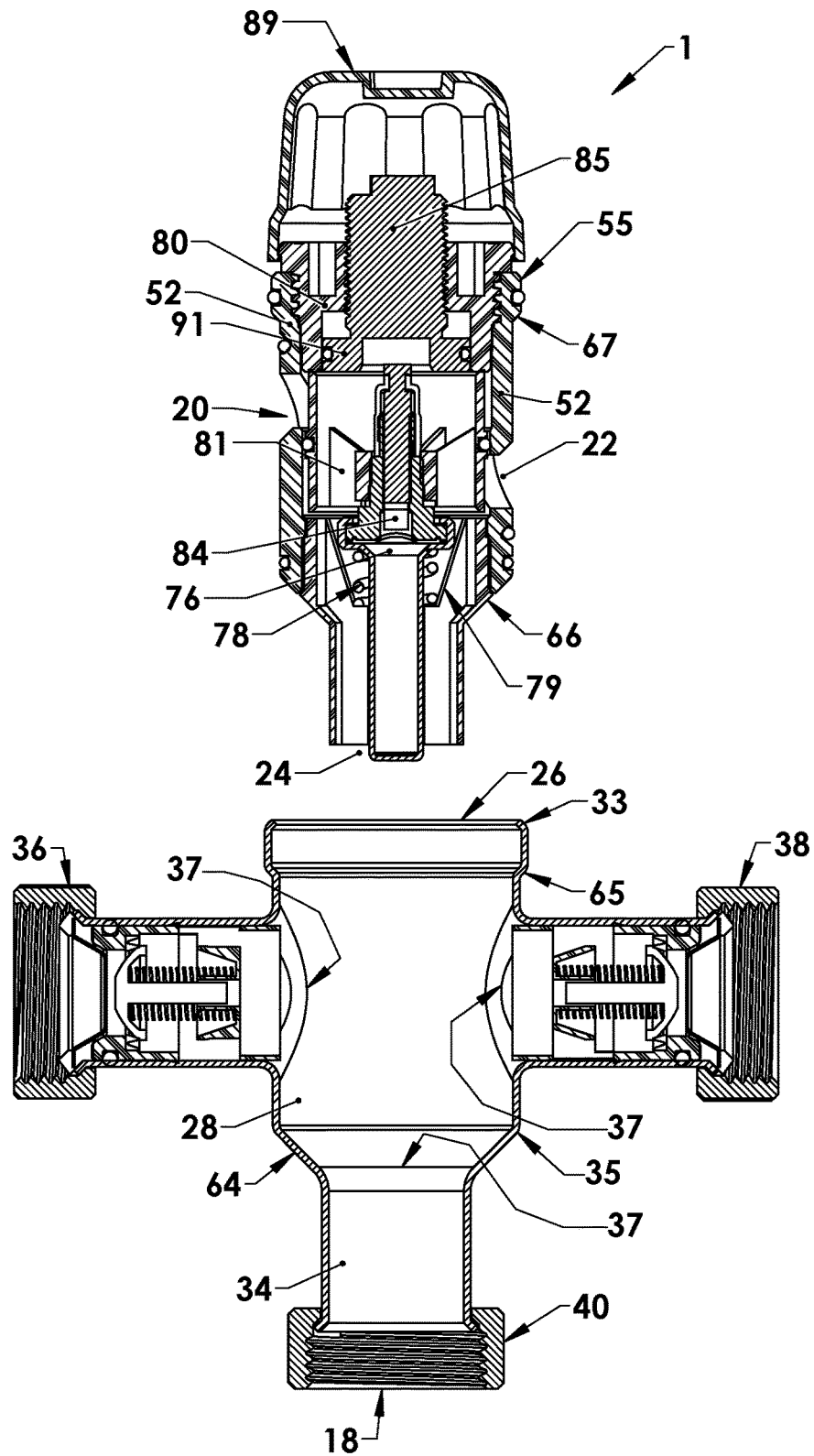
FIG. 2C is a cross-sectional front view taken along the line A-A in FIG. 2B.
Figure 2D:
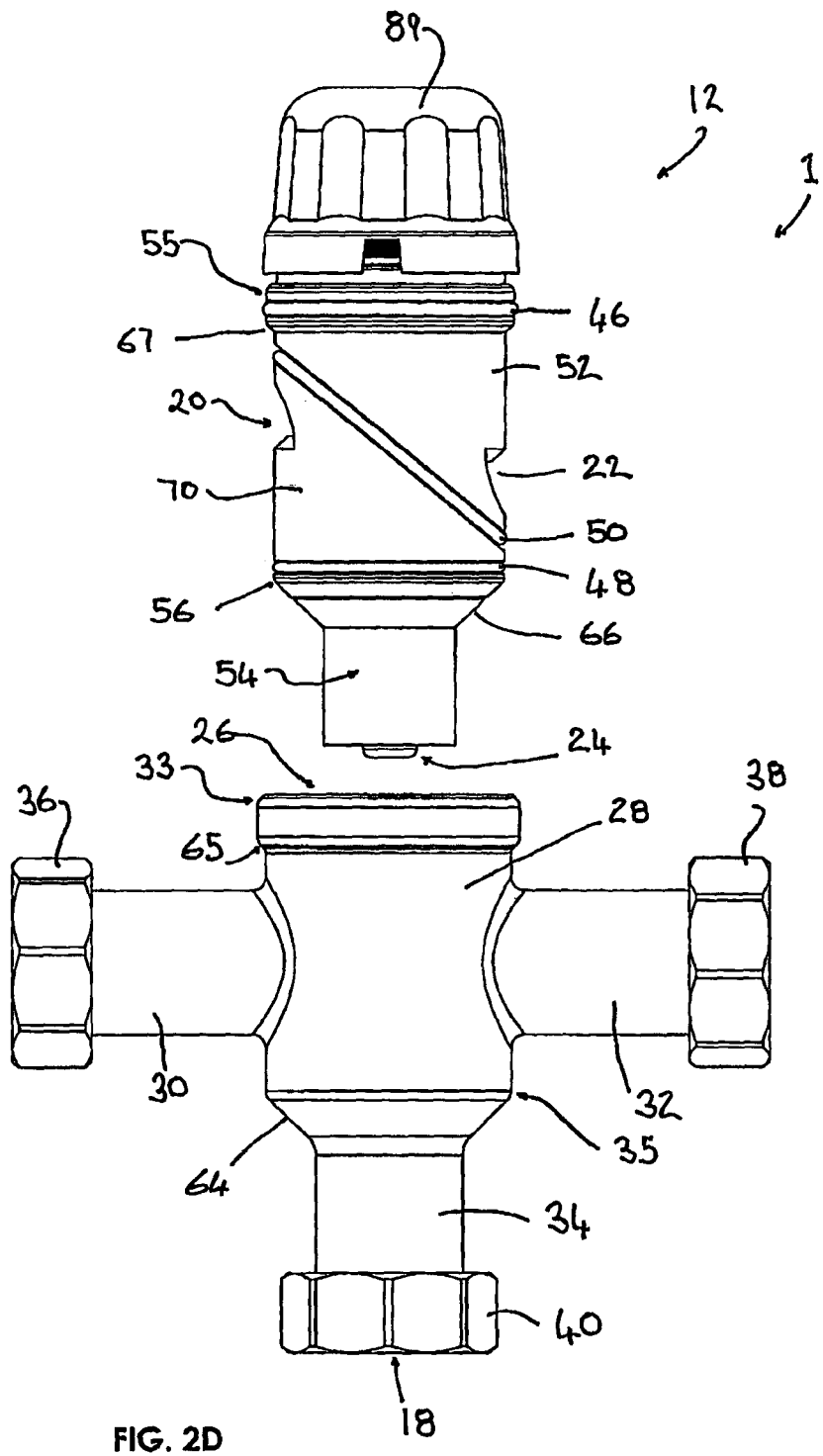
FIG. 2D is a front view of the valve shown in FIG. 2A.

The main part 52 of the cartridge 12 is provided with a shoulder 66 adjacent the end 56 of the main part 52. The shoulder 66 may taper to the tubular member 54, as best seen in FIGS. 2B to 2D. The diameter of the main part 52 is greater than the diameter of the tubular member 54. The main part 52 of the cartridge 12 is provided with another shoulder 67 near the end 55.

The shoulders 66 and 67 of the cartridge 12 sit on the shoulders 64 and 65, respectively, of the casing 10 inside the casing 10.

The casing 10 and the cartridge 12 are dimensioned such that the cartridge 12 can be inserted into the casing 10, via the access opening 26, during manufacture of the valve 1. However, the gap between the internal surface 68 of the casing 10 and the external surface 70 of the cartridge 12 is minimal such that the internal surface 68 of the casing 10 is substantially in contact with the exterior surface 70 of the cartridge 12 when the cartridge 12 is in position inside the casing 10. The seals 46, 48 and 50 are in sealing contact with the interior surface 68 of casing 10.

The first and second inlet openings 20 and 22 of the cartridge 12 are provided at diametrically spaced locations of the main part 52 of the cartridge 12. In addition, the first and second inlet openings 20 and 22 are longitudinally displaced, i.e. they are spaced apart in the longitudinal dimension of the main part 52 of the cartridge 12.

The seals 46 and 48 ensure that fluid that enters from the tubular members 30 and 32 of the casing 10 cannot leak from between the casing 10 and the cartridge 12, even though the gap between the internal surface 68 of the casing 10 and the external surface 70 of the cartridge 12 is minimal. In addition, the seal 50 prevents fluid that enters from the tubular members 30 and 32 from mixing together in the gap between the internal surface 68 of the casing 10 and the external surface 70 of the cartridge 12, even though the gap is minimal.

The cartridge 12 is retained in the casing 10 by suitable retention means.

In the valve 1, the retentions means is provided by a region 72 near the edge 33 of the casing 10 adjacent the access opening 26. The region 72 is rolled over to engage with a portion of the cartridge 12.

However, alternative forms of retention means may be provided. For example, in an alternative arrangement (not shown), the retention means may comprise a screw, fastening pin, or similar element engaging with the casing 10 and the cartridge 12. In another alternative arrangement, the retention means may comprise a fastening clip (for example, a circlip).

First Embodiment (TMV)—Cartridge Components

Figure 1C:
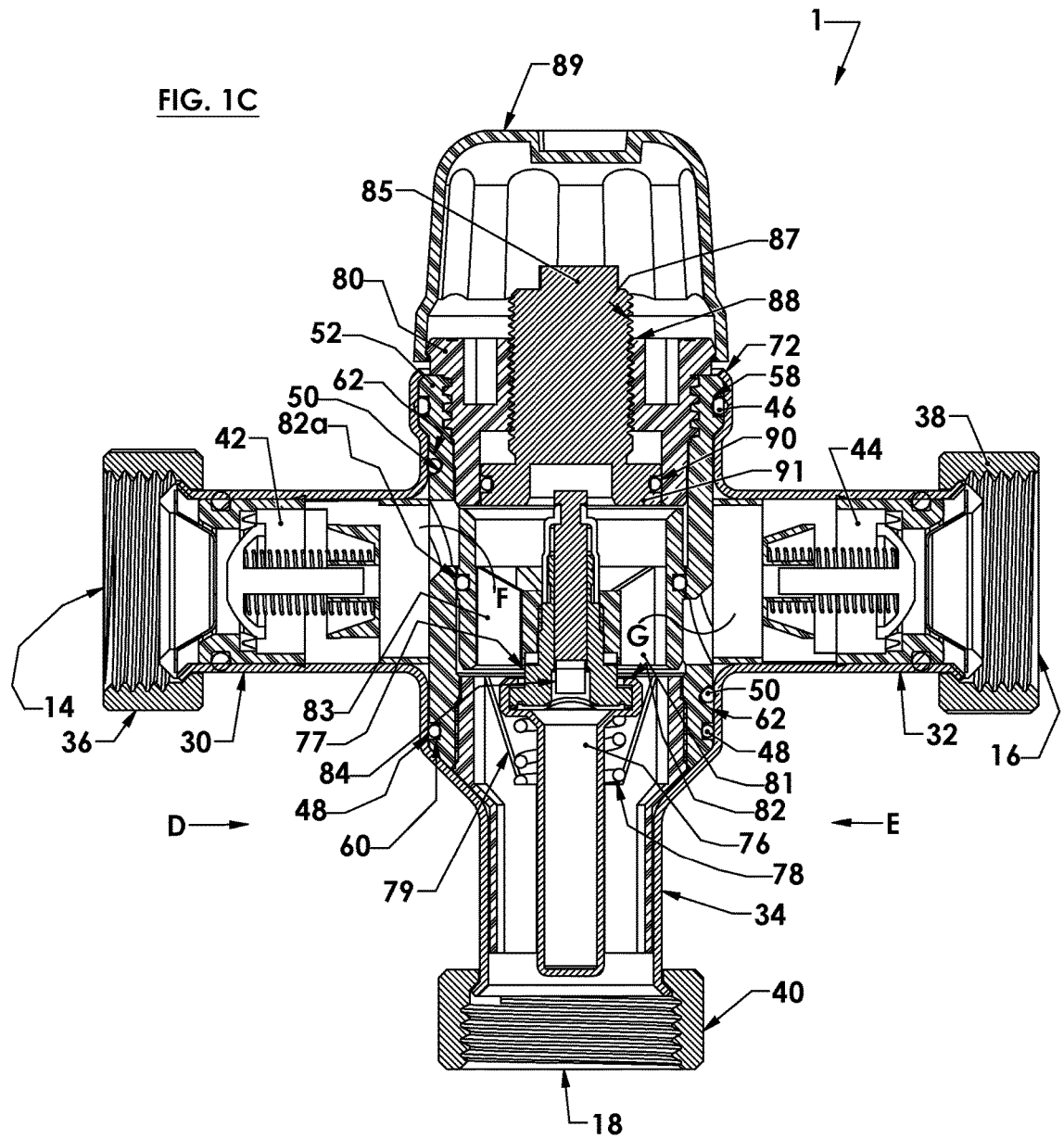
FIG. 1C is a cross-sectional front view of the valve shown in FIG. 1A.

The cartridge 12 is provided with the operational components of the valve 1, as best seen in FIGS. 1C and 2C, and will be now described. As previously stated herein, the valve 1 is a thermostatic mixing valve.

The main part, or main body part, 52 of the cartridge 12 forms a housing for the operational components of the valve 1.

A valve member 76, a valve seat 77, a spring 78, a boot 79 for the spring 78, a cap 80 and a temperature sensor-adjuster 81 are provided in the main part 52 of the cartridge 12. The valve member 76 is provided with a seal 82.

The spring 78 biases the valve member 76 to seat on the valve seat 77 such that the seal 82 of the valve member 76 is in sealing contact with the valve seat 77. This is the closed condition of the valve 1 in which fluid is unable to flow through the valve 1. The closed condition of the valve 1 is shown in FIG. 1C. The spring 78 is contained in the boot 79, which shields the spring 78 from the fluid that may flow through the valve 1. In this way, the spring 78 is shielded from any corrosive elements in the fluid. The cap 80 is attached to the main part 52 to retain the operational components of the valve 1 within the cartridge 12.

A seal 82a is provided between the internal surface of the main part 28 and a support frame 83 of the temperature sensor-adjuster 81. The seal 82a prevents fluid, which has entered the cartridge 12 via the first and second inlet openings 20 and 22, from reaching the outlet opening 24 by passing between the main part 28, of the cartridge 12, and the support frame 83. This ensures that fluid, which has entered the cartridge 12 via the first and second inlet openings 20 and 22, can reach the outlet opening 24 only by flowing past the valve seat 77 when the valve member 76 is unseated from the valve seat 77.

In addition to the support frame 83, the temperature sensor-adjuster 81 comprises a temperature-sensitive element 84 and an adjuster screw 85. The adjuster screw 85 is provided with a screw thread 87, which engages with a complementary screw thread 88 in the cap 80. The adjuster screw 85 is able to turn in either direction via the engaging screw threads 87 and 88. Turning the adjuster screw 85, via the screw threads 87 and 88, results in the temperature-sensitive element 84 being moved either toward or away from the valve seat 77, depending upon the direction in which it is turned. A cover 89 is provided over the cap 80 and the adjuster screw 85. The adjuster screw 85 may be accessed from outside cartridge 12 by removing the cover 89.

A portion of the cap 80, a portion of the adjuster screw 85 and the cover 89 of the cartridge 12 are located outside the casing 10. The region 72 near the edge 33 of the casing 10 adjacent the access opening 26 is rolled over to engage with a portion of the cartridge 12. The region 72 engages with a portion of the main part 52 of the cartridge 12 adjacent the edge 55.

A seal 90 is provided between the cap 80 and the base 91 of the adjuster screw 85 to prevent fluid coming into contact with the screw threads 87 and 88.

The seals 82a and 90 may be O-rings.

First Embodiment (TMV)—Use and Operation

The manner of use and operation of the valve 1 will now be described.

The use and operation of the valve 1 of the present invention is similar to that of temperature pressure relief valves of the prior art.

In use, the valve 1 may be connected to pipes of a plumbing installation, such as a hot water system (not shown), using the lock nuts 36, 38 and 40. The inlet opening 14 is connected to a cold water pipe (of the plumbing installation), the inlet opening 16 is connected to a hot water pipe (of the plumbing installation) and the outlet opening 18 is connected to a tempered water pipe (of the plumbing installation). In a domestic situation, for example, the tempered water pipe would supply water to locations such as, for example, the shower, bathtub and basin water outlets in a bathroom, i.e. to the taps, faucets and showerheads.

Flow of fluid, e.g. water, through the valve 1 may commence when a fluid outlet device such as, for example, a tap is opened downstream of the valve 1. When this occurs, water at a first temperature (cold water) is able to enter the cartridge 12, from the tubular member 30, via the first inlet opening 20 (as shown by the arrow F in FIG. 1C) and water at a second temperature (hot water) is able to enter the cartridge 12, from the tubular member 32, via the second inlet opening 22 (as shown by the arrow G in FIG. 1C). The inflowing water unseats the valve member 76 from the valve seat 77, exposing the opening defined by the valve seat 77. This is the open condition of the valve 1. The inflowing water flows through the opening, defined by the valve seat 77 (from which the seal 82 has been unseated), into the tubular member 54, of the cartridge 12, where the cold and hot water is mixed and then exits from the outlet opening 24 of the cartridge 12 and the outlet opening 18 of the casing 10 into the tempered water pipe of the plumbing installation.

Since the inlet openings 14 and 16 of the casing 10 and the first and second inlet openings 20 and 22 of the cartridge 12, respectively, are in fluid communication and the outlet opening 18 of the casing 10 and the outlet opening 24 of the cartridge 12 are in fluid communication, a fluid flow path is created through the valve 1 from the inlet openings 14 and 16 of the casing 10, through the cartridge 12, to the outlet opening 18 of the casing 10, in the open condition of the valve 1. In the open condition of the valve 1, the valve member 76 is unseated from the valve seat 77 such that a fluid flow path is created from the first and second inlet openings 20 and 22 of the cartridge 12, through the opening defined by the valve seat 77 (from which the valve member 76 is unseated), to the outlet opening 24 of the cartridge 12.

The temperature of the tempered water that exits the outlet opening 24 may be adjusted using the adjuster screw 85. Turning the adjuster screw 85 moves the support frame 83 to adjust the relative flow rates of the cold and hot water that are able to enter the cartridge 12.

If the temperature-sensitive element 84 expands, the flow of hot water into the cartridge 12 is reduced and the flow of cold water into the cartridge 12 is increased. If the temperature-sensitive element 84 contracts, the flow of cold water into the cartridge 12 is reduced and the flow of hot water into the cartridge 12 is increased. In this way, the temperature of the tempered water that exits from the outlet opening 24 may be maintained at the temperature that has been set via the adjuster screw 85.

Second Embodiment (PTR)—Description

In FIGS. 3A to 3C and FIGS. 4A to 4D, there is shown a second embodiment of a valve 2 in accordance with one aspect of the present invention. The valve 2 shown in these figures is of the pressure temperature relief (PTR) valve type.

The valve 2 comprises a casing 210 and a cartridge 212. The cartridge 212 is partly located in the casing 210. The cartridge 212 is provided with the operational components of the valve 2 as will be described later herein.

The casing 210 has an inlet opening 214 and an outlet opening 218. The inlet opening 214 forms the inlet opening for the valve 2, and the outlet opening 218 forms the outlet opening for the valve 2. The cartridge 212 is provided with an inlet opening 220 and an outlet opening 224.

The inlet opening 214 of the casing 210 is in fluid communication with the inlet opening 220 of the cartridge 212. The outlet opening 218 of the casing 210 is in fluid communication with the outlet opening 224 of the cartridge 212. The fluid communication of the respective inlet opening of the casing 210 and the cartridge 212 and the respective outlet opening of the casing 210 and the cartridge 212 is achieved by having the respective inlet and outlet openings aligned.

The casing 210 has opening 215. The opening 215 is substantially diametrically opposed to the outlet opening 218. The cartridge 212 has an opening 217. A screw thread 219 is provided in the wall of the cartridge 212 at the opening 217. The openings 215 and 217 are aligned such that they are in fluid communication.

Figure 4A:
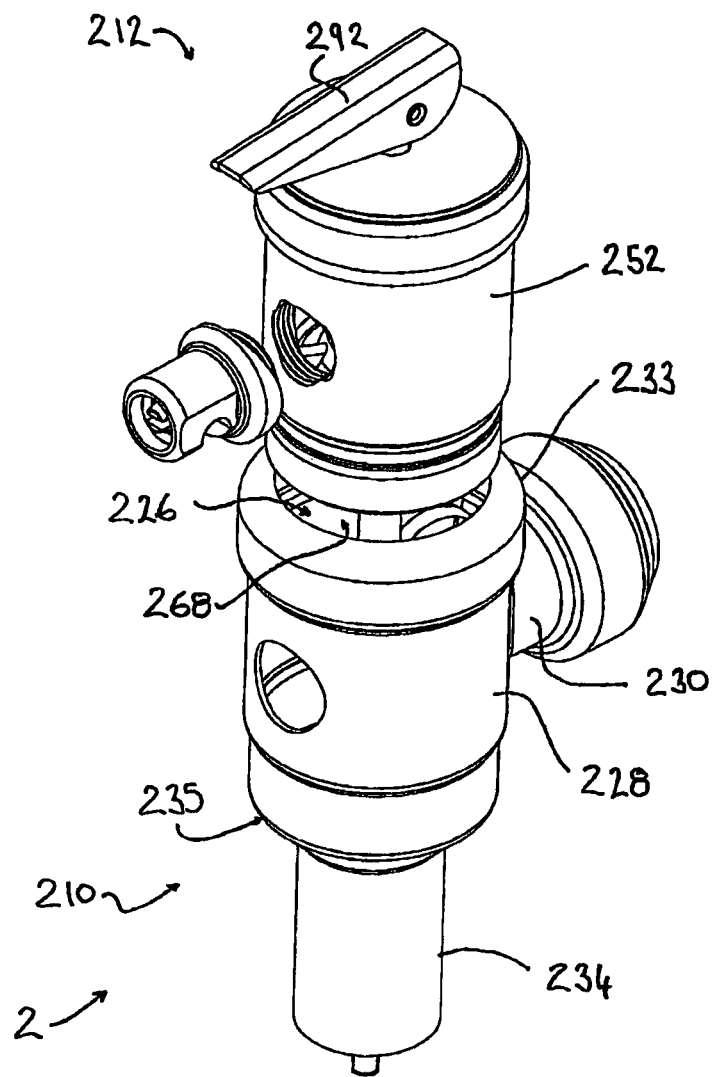
FIG. 4A is an exploded perspective view of the valve shown in FIG. 3A.
Figure 4B:
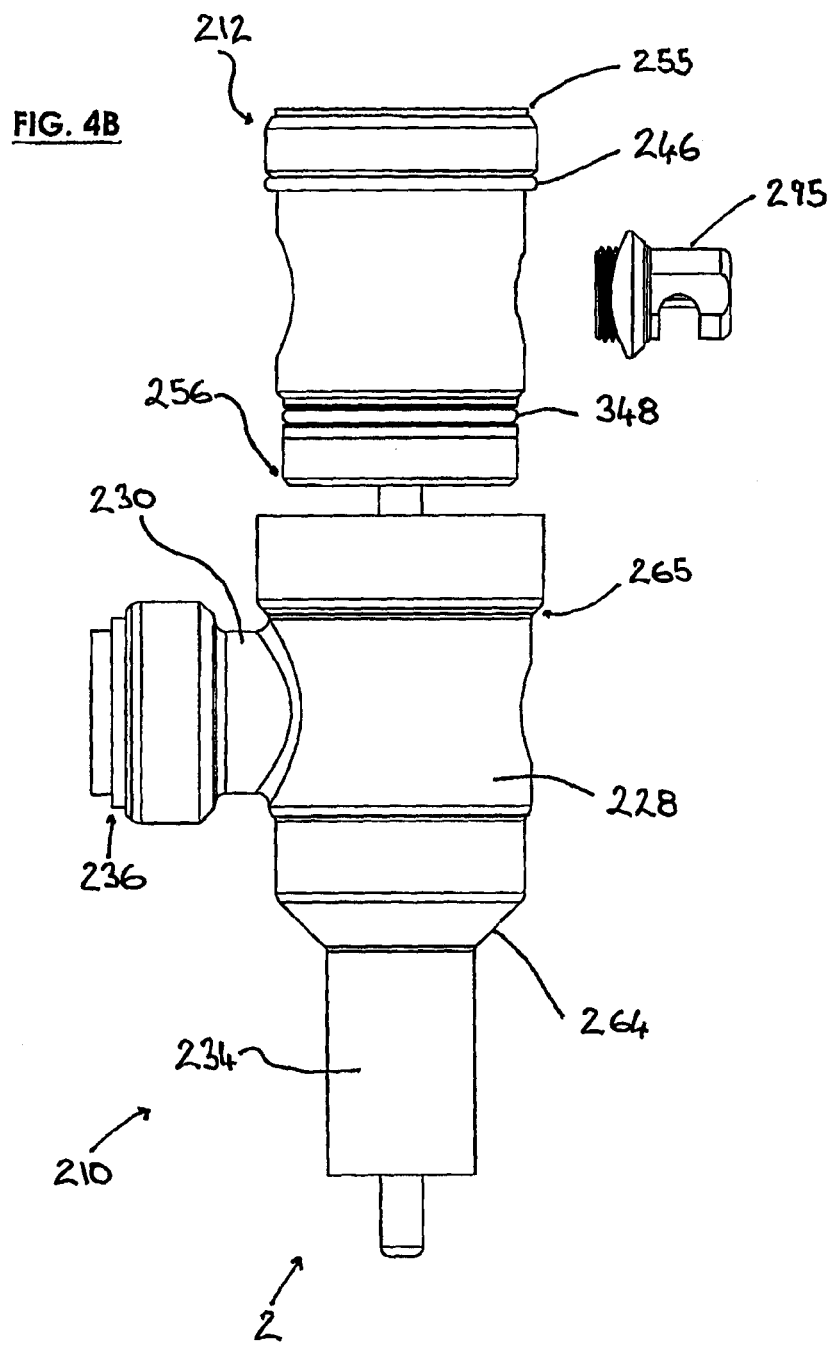
FIG. 4B is a front view of the valve shown in FIG. 4A.

The casing 210 has an access opening 226 such that the cartridge 212 can be inserted into the casing 210 at the time of manufacture of the valve 2. The access opening 226 is best seen in FIG. 4A, which is an exploded view of the valve 2 showing the cartridge 212 located outside the casing 210.

The casing 210 comprises a main part, or main body portion, 228 and tubular members 230 and 234. The access opening 226 is provided at a first end 233 of the main part 228 of the casing 210. The tubular member 230 extends from the main part 228 as an offset portion. The tubular member 234 extends from the other end 235 of the main part 228, which is opposed to the access opening 226. In this way, the casing 210 is substantially L-shaped. The tubular members 230 and 234 are in fluid communication with the main part 228 of the casing 210. The main part 228 of the casing 210 accommodates the cartridge 212.

The casing 210 is provided with a formation in the form of an opening 237 between the main part 228 and the tubular member 230. An opening 237 is also provided between the main part 228 and the tubular member 234. The respective interiors of the main part 228 and the tubular members 230 and 234 are in communication via the respective openings 237.

A connection fitting 240*a* is provided at the distal end of the tubular members 230 that is spaced from the main part 228. The connection fitting 240*a* enables the valve 2 to be connected to pipes in a plumbing installation (not shown). The connection fitting 240*a* may be a press-fit connector.

A one-way flow valve (not shown) may be provided in the tubular member 230. The one-way flow valve ensures that fluid is able to flow in the tubular members 230 in the direction from the inlet opening 214 to the main part 228. This direction is shown by the arrow H in FIG. 3B.

Seals 246 and 248 are provided between the casing 210 and the cartridge 212. The seal 246 is provided near the access opening 226 of the casing 210. The seal 248 is provided at the region of the end of the main part 228 which is near the tubular member 234. The seals 246 and 248 may be O-rings.

The cartridge 212 comprises a main part, or main body, 252 having respective ends 255 and 256.

The seals 246 and 248 are located in respective grooves 258 and 260 provided on the exterior of the main part 252 of the cartridge 212. The seals 246 and 248 and their respective grooves 258 and 260 are spaced apart and provided substantially near respective ends 255 and 256 of the main part 252 of the cartridge 212.

Figure 3A:
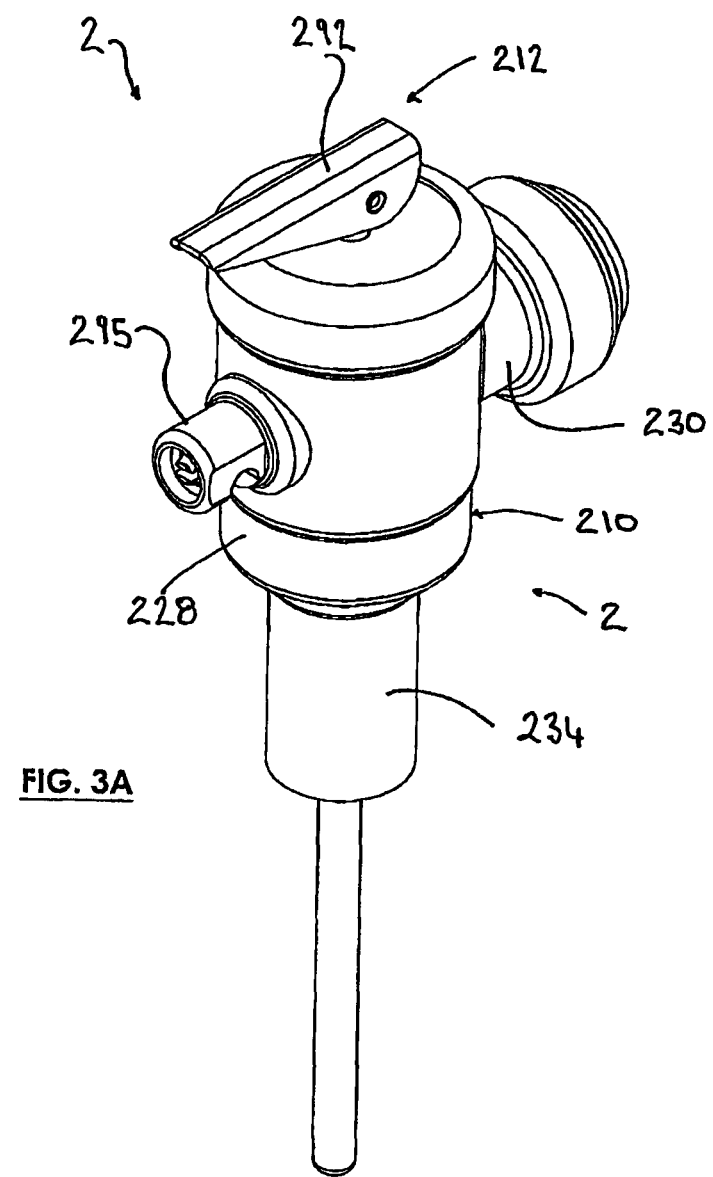
FIG. 3A is a perspective view of a second embodiment of a device for a plumbing installation, in the form of a valve (being a pressure temperature relief valve), in accordance with an aspect of the present invention.
Figure 3B:
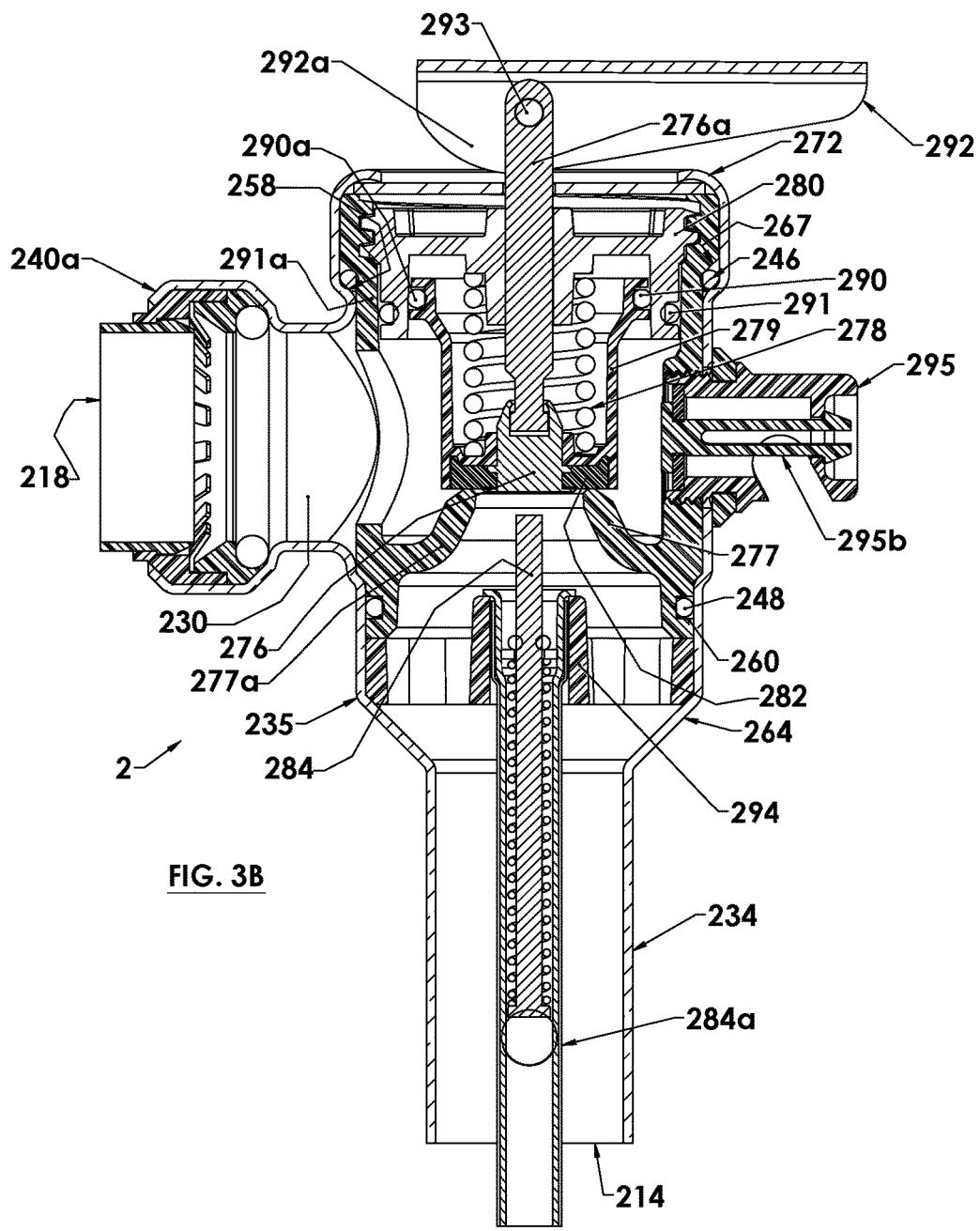
FIG. 3B is a first cross-sectional front view of the valve shown in FIG. 3A, with the valve in a closed condition.
Figure 4D:
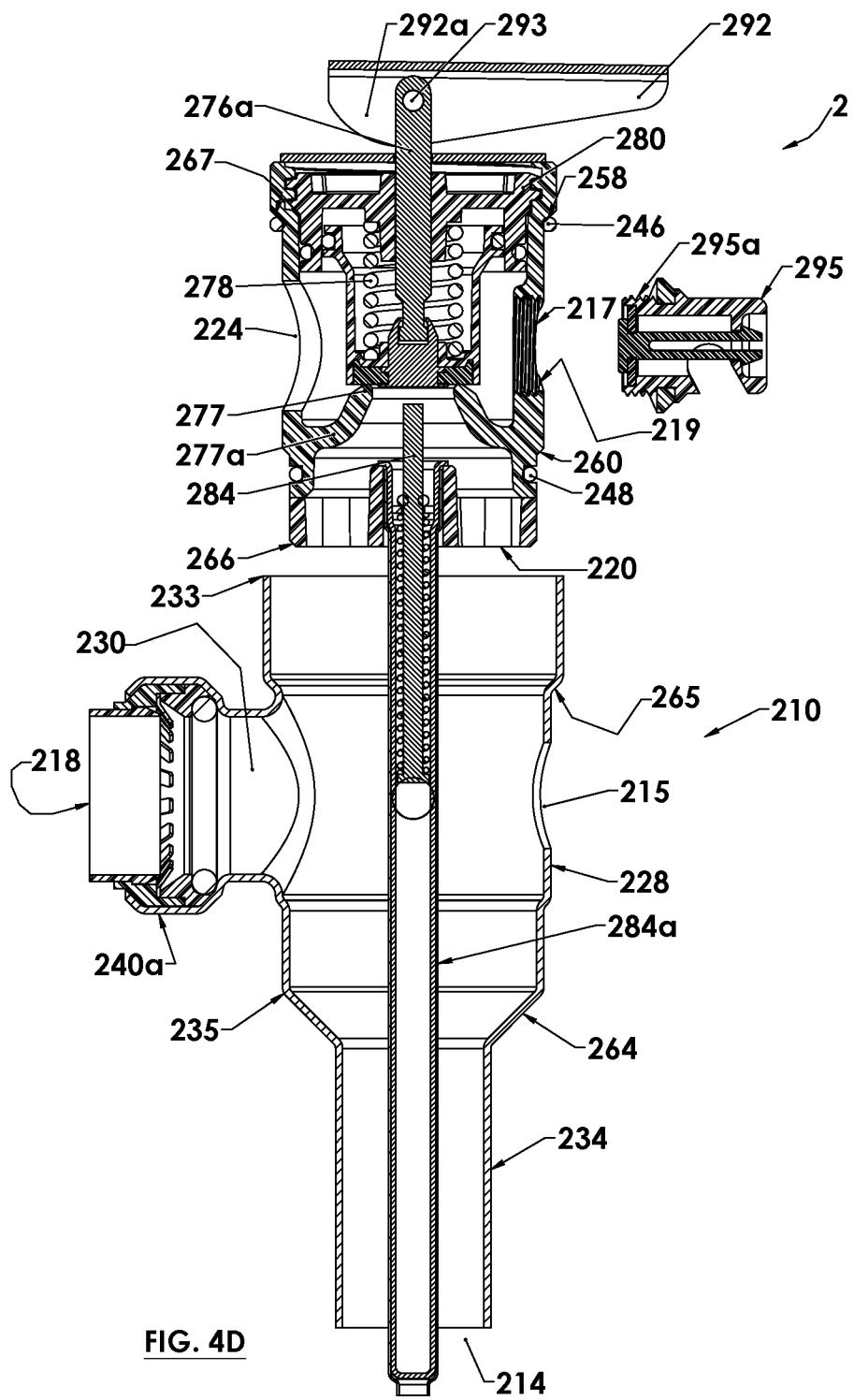
FIG. 4D is a cross-sectional front view taken along the line B-B in FIG. 4C.

The casing 210 is provided with a formation in the form of a shoulder 264 adjacent the end 235 of the main part 228 of the casing 210. The shoulder 264 may taper to the tubular member 234, as best seen in FIG. 3B and FIGS. 4C and 4D. The diameter of the main part 228 is greater than the diameter of the tubular member 234. The casing 210 is provided with another formation in the form of a shoulder 265 near the end 233.

The main part 252 of the cartridge 212 is provided with a shoulder 266 adjacent the end 256 of the main part 252. The shoulder 266 may be tapered, as best seen in FIG. 4D. The main part 252 of the cartridge 212 is provided with another shoulder 267 near the end 255.

The shoulders 266 and 267 of the cartridge 212 sit on the shoulders 264 and 265, respectively, of the casing 210 inside the casing 210.

The casing 210 and the cartridge 212 are dimensioned such that the cartridge 212 can be inserted into the casing 210, via the access opening 226, during manufacture of the valve 2. However, the gap between the internal surface 268 of the casing 210 and the external surface 270 of the cartridge 212 is minimal such that the internal surface 268 of the casing 210 is substantially in contact with the exterior surface 270 of the cartridge 212 when the cartridge 212 is in position inside the casing 210. The seals 246 and 248 are in sealing contact with the interior surface 268 of casing 210.

The seals 246 and 248 ensure that fluid that enters from the tubular member 230 of the casing 210 cannot leak from between the casing 210 and the cartridge 212, even though the gap between the internal surface 268 of the casing 210 and the external surface 270 of the cartridge 212 is minimal.

The cartridge 212 is retained in the casing 210 by suitable retention means.

In the valve 2, the retentions means is provided by a region 272 near the edge 233 of the casing 210 adjacent the access opening 226. The region 272 is rolled over to engage with a portion of the cartridge 212.

However, alternative forms of retention means may be provided. For example, in an alternative arrangement (not shown), the retention means may comprise a screw, fastening pin, or similar element engaging with the casing 210 and the cartridge 212. In another alternative arrangement, the retention means may comprise a fastening clip (for example, a circlip).

Second Embodiment (PTR)—Cartridge Components

Figure 3C:
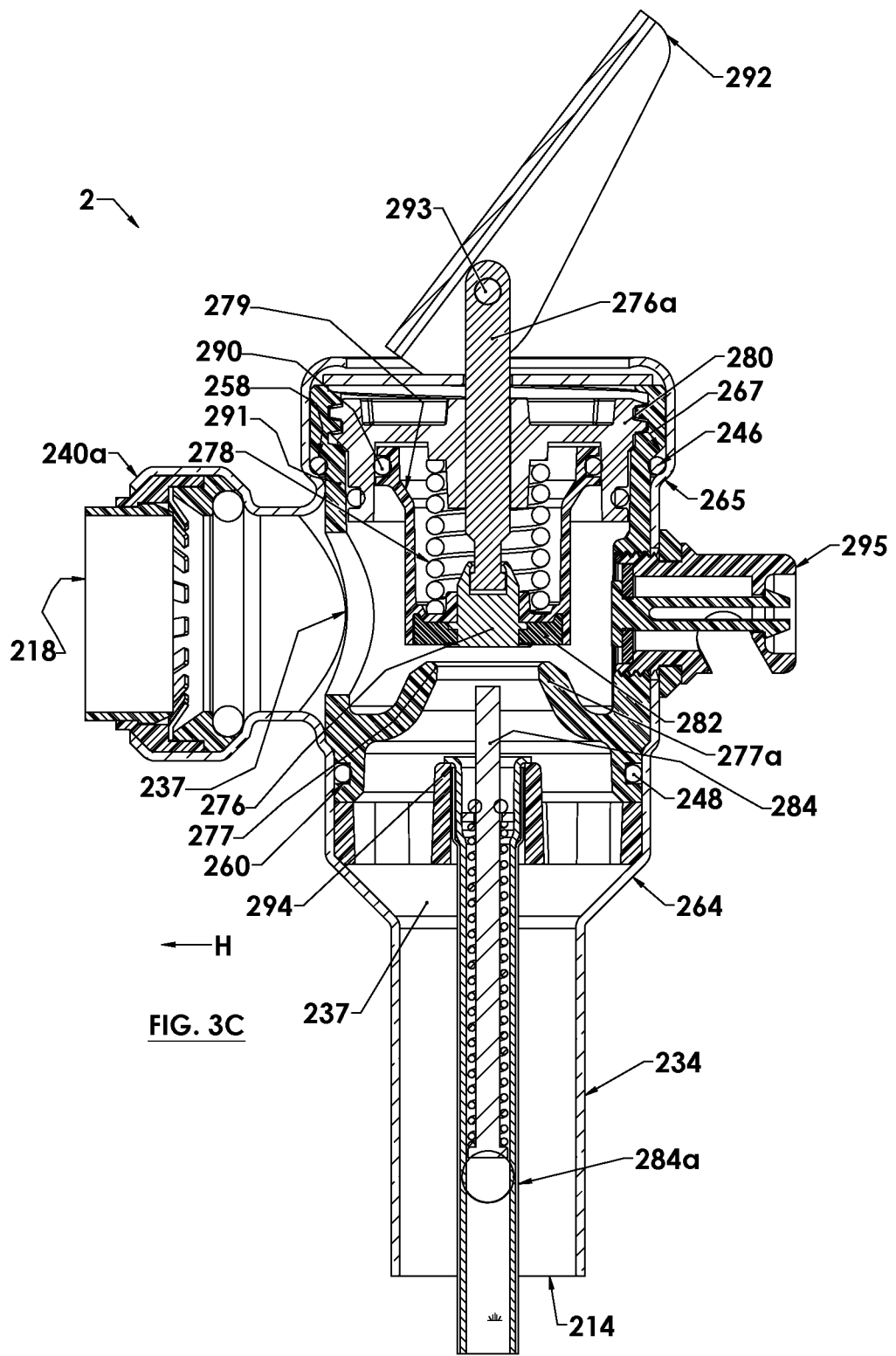
FIG. 3C is a second cross-sectional front view of the valve shown in FIG. 3A, with the valve in an open condition.

The cartridge 212 is provided with the operational components of the valve 2, as best seen in FIGS. 3B, 3C and 4D, and will be now described. As previously stated herein, the valve 2 is a pressure temperature relief valve.

The main part, or main body part, 252 of the cartridge 212 forms a housing for the operational components of the valve 2.

A valve member 276, a valve seat 277, a spring 278, a boot 279 for the spring 278, and a cap 280 are provided in the main part 252 of the cartridge 212. The valve member 276 is provided with a seal 282. The valve seat 277 is formed by an annular extension 277a from the wall of the main part 252.

The spring 278 biases the valve member 276 to seat on the valve seat 277 such that the seal 282 is in sealing contact with the valve seat 277. This is the first condition, i.e. closed condition, of the valve 2 in which fluid is unable to flow through the valve 2. The closed condition of the valve 2 is shown in FIG. 3B. The spring 278 is contained in the boot 279, which shields the valve member 276 and the spring 278 from the fluid that may flow through the valve 2. In this way, the valve member 276 and spring 278 are shielded from any corrosive elements in the fluid. The cap 280 is attached to the main part 252 to retain the operational components of the valve 2 within the cartridge 212.

A seal 290 is provided between the cap 280 and the boot 279 to prevent fluid entering the boot 279 and coming into contact with the valve member 276 and the spring 278. The seal 290 is provided in a groove 290a formed in the boot 279. A further seal 291 is provided between the cap 280 and the interior surface of the main part 228. The seal 291 prevents fluid leaking from between the main part 228 and the cap 280 to the exterior of the main part 228. The seal 291 is provided in a groove 291a formed in the cap 280. The seals 290 and 291 may be O-rings.

The valve member 276 is attached to an extension member 276a. The extension member 276a extends through the cap 280 to the exterior of the main part 228 of the cartridge 212. The extension member 276a is connected to a lever 292 by a pivotal connection 293. The lever 292 and pivotal connection 293 are located externally of the main part 228. The lever 292 is provided with a cam 292a, which bears against the outer surface of the cap 280.

The cartridge 212 further comprises a temperature-sensitive element 284 contained in a sheath 284a. The temperature-sensitive element 284 and sheath 284a form a temperature probe. The sheath 284a protects the temperature-sensitive element 284 from corrosive elements in the fluid. A support member 294 supports the sheath 284a. The support member 294 is provided near the end 256 of the main part 228 of the cartridge 212. The sheath 284a extends out from the main part 228 of the cartridge 212 from the end 256 of the cartridge 212.

Fluid is able to flow through the inlet opening 220 into the cartridge 212, past the support member 294, and exit from the outlet 224 of the cartridge 212 in an open condition of the valve 2, as will be further described herein.

The region 272 near the edge 233 of the casing 210 adjacent the access opening 226 is rolled over to engage with a portion of the cartridge 212. The region 272 engages over a portion of the main part 252 of the cartridge 212 adjacent the edge 255.

An auxiliary pressure relief 295 is accommodated by the opening 215 in the casing 210 and the opening 217 in the cartridge 212. The auxiliary pressure relief 295 has a screw thread 295a, which engages with the screw thread 219 of the opening 217. In the event that the main pressure relief becomes blocked such that fluid cannot exit via the outlet 224 in the open condition of the valve 2, the auxiliary pressure relief 295 has a component 295b that will be ejected to thereby provide pressure relief.

Second Embodiment (PTR)—Use and Operation

The manner of use and operation of the valve 2 will now be described.

The use and operation of the valve 2 of the present invention is similar to that of pressure temperature relief valves of the prior art. In that regard, the valve 2 is secured in position by the tubular member 234. The valve 2 is secured in position such that the temperature probe extends into the fluid whose temperature is to be sensed. The fluid, for example, may be contained in a water storage tank (not shown).

The temperature-sensitive element 284 inside the sheath 284a, of the temperature probe, expands with a rise in temperature of the fluid. If the temperature of the fluid rises to a particular level, the temperature-sensitive element 284 will expand to such an extent that it pushes against the valve member 276 and forces it to unseat from the valve seat 277, against the biasing action of the spring 278. This moves the seal 282 out of contact with the valve seat 276. This places the valve 2 in an open condition, as shown in FIG. 3C. In the open condition of the valve 2, the fluid, e.g. water, is able to flow from the storage tank into the inlet opening 220 of the casing 210 and the inlet opening 220, of the cartridge 212, into the cartridge 212. The water is then able to flow past the support member 294, through the opening defined by the valve seat 277 (from which the seal 282 has been unseated), and exits through the outlet opening 224 of the cartridge 212 and the outlet opening 218 of the casing 210. In this way, valve 2 and allows fluid to escape from the storage tank, through the open valve 2 and drain out through the outlet opening 218 to relieve pressure build-up in the storage tank.

Since the inlet opening 214 of the casing 210 and the inlet openings 220 of the cartridge 212 are in fluid communication and the outlet opening 218 of the casing 210 and the outlet opening 224 of the cartridge 212 are in fluid communication, a fluid flow path is created through the valve 2 from the inlet opening 214 of the casing 210, through the cartridge 212, to the outlet opening 218 of the casing 210, in the open condition of the valve 2. In the open condition of the valve 2, the valve member 276 is unseated from the valve seat 277 such that a fluid flow path is created from the inlet opening 220 of the cartridge 212, through the opening defined by the valve seat 277 (from which the valve member 276 is unseated), to the outlet opening 224 of the cartridge 12.

When the temperature of the fluid in the storage tank decreases, the temperature-sensitive element 284 contracts. As the temperature-sensitive element 284 contracts, the biasing action of the spring 278 moves the valve member 276 toward the valve seat 277. Once the temperature of the fluid in the storage tank has decreased to below the particular level, the temperature-sensitive element 284 has contracted to an extent that it no longer bears against the valve member 276 and the valve member 276 is returned to its position in which it is seated on the valve seat 277 under the biasing action of the spring 278, in the closed condition of the valve 2.

The lever 292 may be manually actuated to open the valve 2 and thereby provide pressure relief, as desired, if required. This condition of the valve 2 is shown in FIG. 3C. The lever 292 provides an override so that the valve 2 may be opened manually if required.

Third Embodiment (NRI)—Description

In FIGS. 5A to 5D and FIGS. 6A to 6D, there is shown a third embodiment of a valve 3 in accordance with one aspect of the present invention. The valve 3 shown in these figures is of the non-return isolating (NRI) valve type.

The valve 3 comprises a casing 310 and a cartridge 312. The cartridge 312 is partly located in the casing 310. The cartridge 312 is provided with the operational components of the valve 3, as will be described later herein.

The casing 310 has an inlet opening 314 and an outlet opening 318. The inlet opening 314 forms the inlet opening for the valve 3, and the outlet opening 318 forms the outlet opening for the valve 3. The cartridge 312 is provided with an inlet opening 320 and an outlet opening 324.

The inlet opening 314 of the casing 310 is in fluid communication with the inlet opening 320 of the cartridge 312. The outlet opening 318 of the casing 310 is in fluid communication with the outlet opening 324 of the cartridge 312. The fluid communication of the respective inlet opening of the casing 310 and the cartridge 312 and the respective outlet opening of the casing 310 and the cartridge 312 is achieved by having the respective inlet and outlet openings aligned.

Figure 6A:
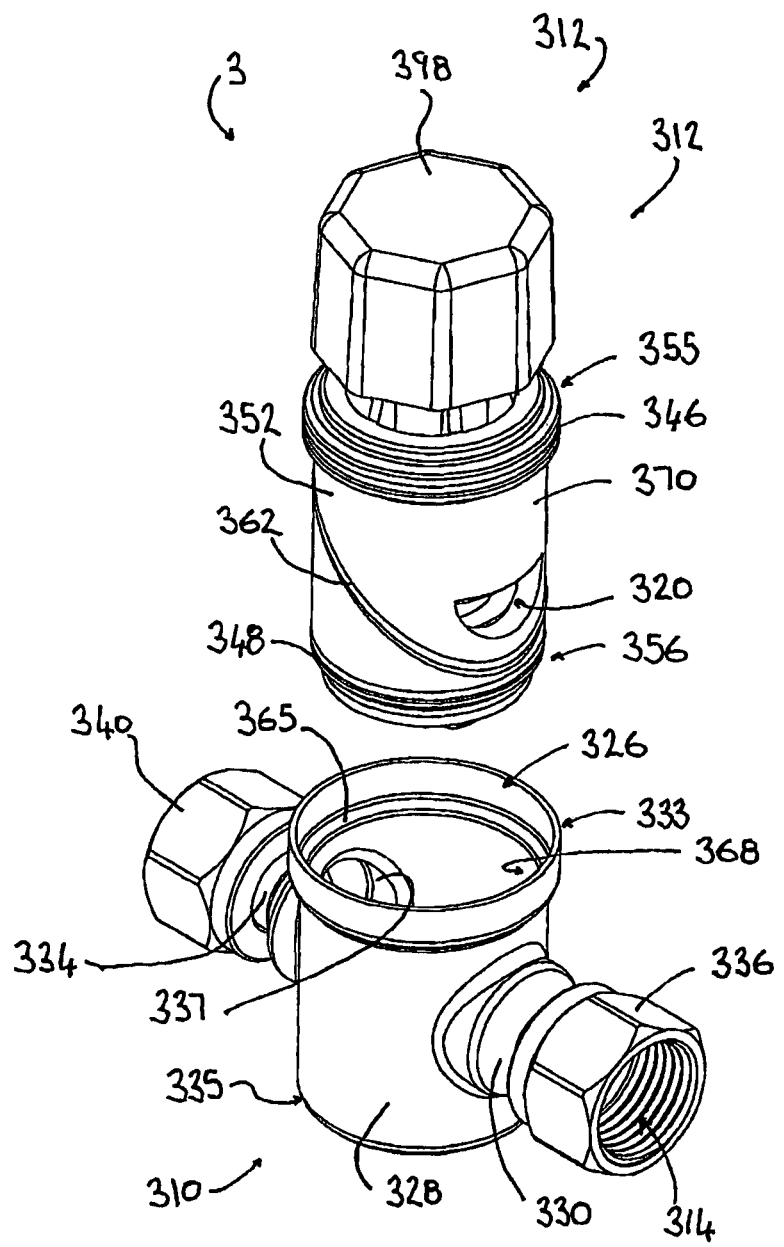
FIG. 6A is an exploded perspective view of the valve shown in FIG. 5A.

The casing 310 has an access opening 326 such that the cartridge 312 can be inserted into the casing 310 at the time of manufacture of the valve 3. The access opening 326 is best seen in FIG. 6A, which is an exploded view of the valve 3 showing the cartridge 312 located outside the casing 310.

The casing 310 comprises a main part, or main body portion, 328 and tubular members 330 and 334. The access opening 326 is provided at a first end 333 of the main part 328 of the casing 310. The tubular members 330 and 334 extend from the main part 328 as offset portions in an arm-like manner and in a diametrically opposed arrangement. In this way, the casing 310 is substantially T-shaped. The tubular members 330 and 334 are in fluid communication with the main part 328 of the casing 310. The main part 328 of the casing 310 accommodates the cartridge 312.

The casing 310 is provided with formations in the form of respective openings 337 between the main part 328 and the tubular members 330 and 334. The respective interiors of the main part 328 and the tubular members 330 and 334 are in communication via the respective openings 337.

Lock nuts 336 and 340 are provided at the distal ends of the tubular members 330 and 334 that are spaced from the main part 328. The lock nuts 336 and 340 enable the valve 3 to be connected to pipes in a plumbing installation (not shown) having screw threaded components, by way of screw threaded connections.

Seals 346, 348, and 350 are provided between the casing 310 and the cartridge 312. The seal 346 is provided near the access opening 326 of the casing 310. The seal 348 is provided at the region of the end of the main part 328, which is near the tubular member 334. The seal 350 extends around the cartridge 312 such that the inlet opening 320 and the outlet opening 324 are isolated from one another by the seal 350. The seal 350 extends around the cartridge 312 in a substantially elliptical manner from a location near the seal 346 to a location near the seal 348. The seals 346, 348 and 350 may be O-rings.

The cartridge 312 comprises a main part, or main body, 352 having respective ends 355 and 356.

The seals 346, 348 and 350 are located in respective grooves 358, 360 and 362 provided on the exterior of the main part 352 of the cartridge 312. The seals 346 and 348 and their respective grooves 358 and 360 are spaced apart and provided substantially near respective ends 355 and 356 of the main part 352 of the cartridge 312.

The main part 328 of the casing 310 is provided with an opening 357 at the end 335 of the main part 328. The opening 357 is opposed to the access opening 326, which is provided at the first end 333.

Figure 6B:
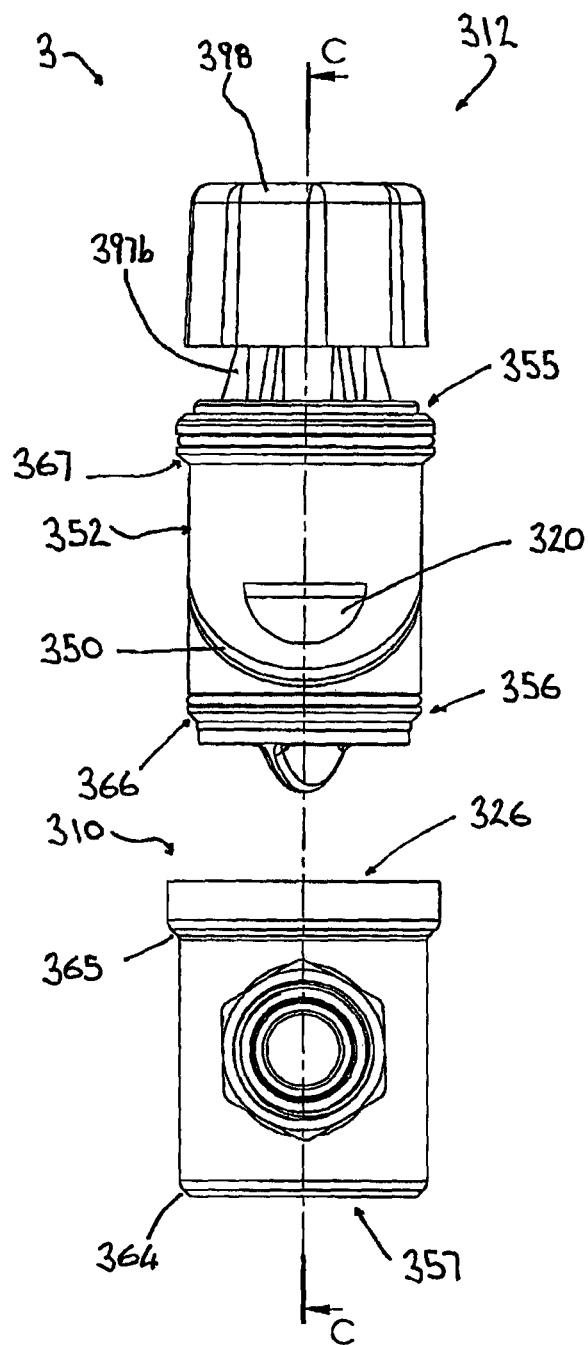
FIG. 6B is a side view of the valve shown in FIG. 6A.
Figure 6C:
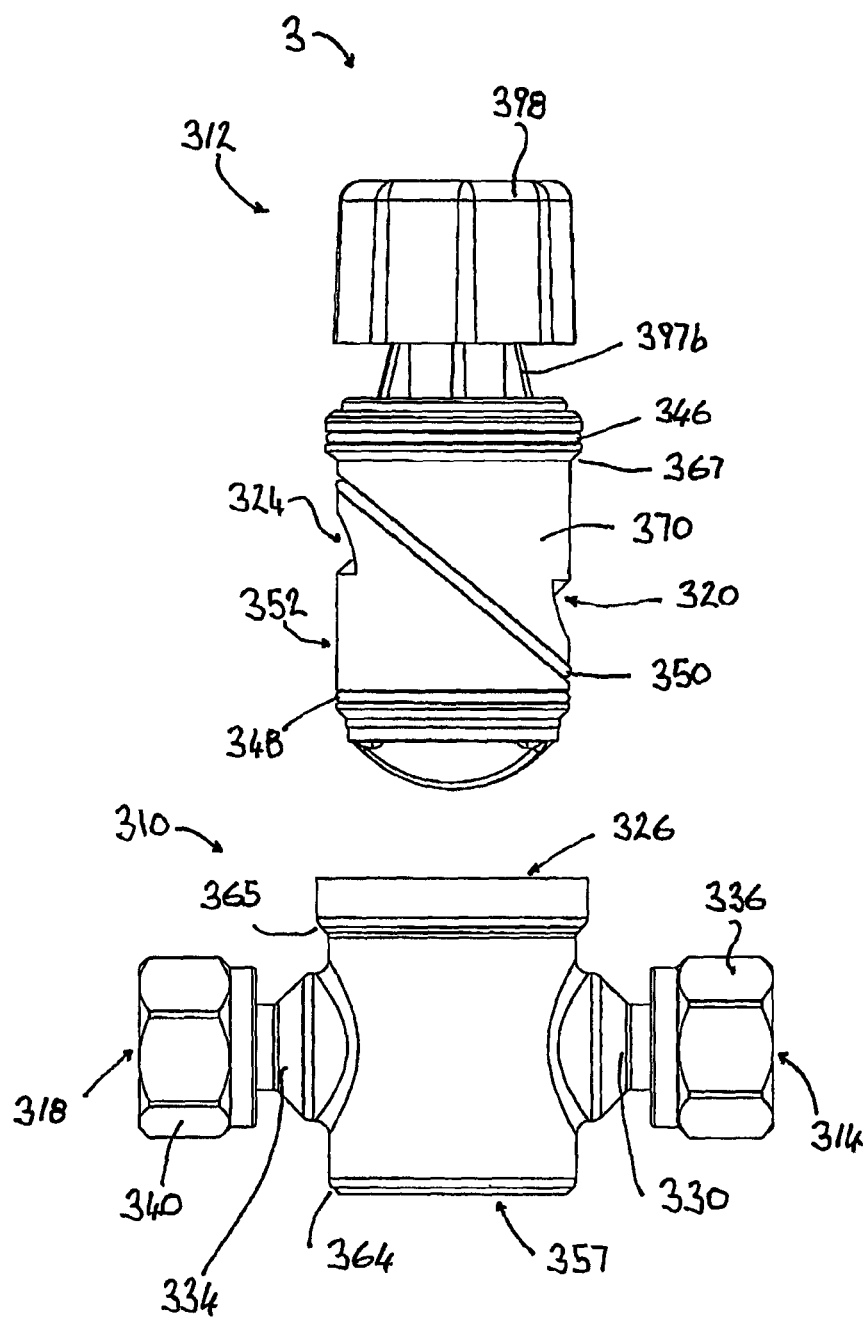
FIG. 6C is a front view of the valve shown in FIG. 6A.
Figure 6D:
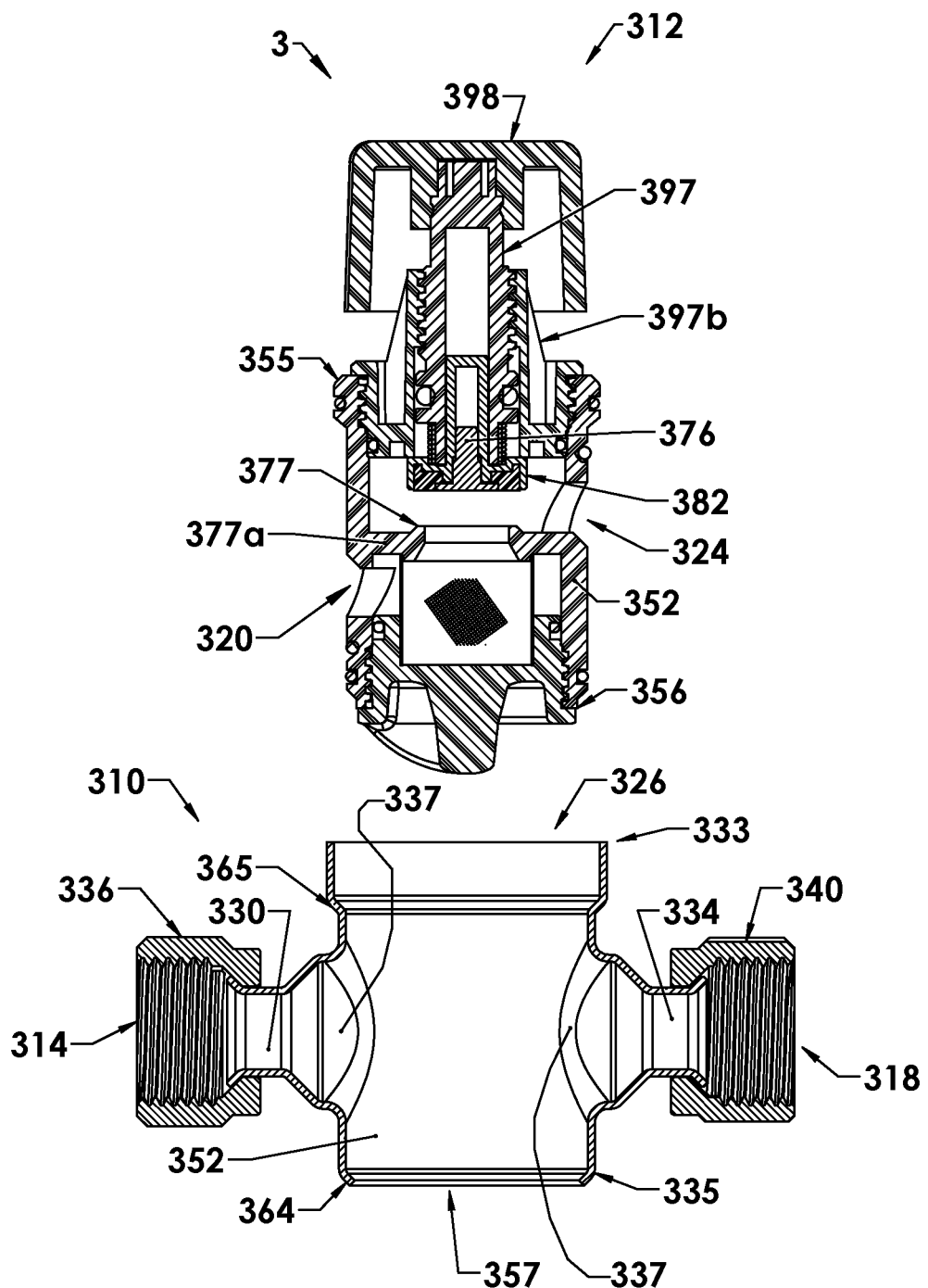
FIG. 6D is a cross-sectional front view taken along the line C-C in FIG. 6B.

The casing 310 is provided with a formation in the form of a shoulder 364 adjacent the end 335 of the main part 328 of the casing 310. The shoulder 364 is tapered so as to form an inwardly turned lip at the end 356, as best seen in FIGS. 6B to 6D, which surrounds the opening 357. The casing 310 is provided with another formation in the form of a shoulder 365 near the end 333.

The main part 352 of the cartridge 312 is provided with a shoulder 366 adjacent the end 356 of the main part 352. The shoulder 366 may be tapered, as best seen in FIGS. 6B to 6D. The main part 352 of the cartridge 312 is provided with another shoulder 367 near the end 355.

The shoulders 366 and 367 of the cartridge 312 sit on the shoulders 364 and 365, respectively, of the casing 310 inside the casing 310.

The casing 310 and the cartridge 312 are dimensioned such that the cartridge 312 can be inserted into the casing 310, via the access opening 326, during manufacture of the valve 3. However, the gap between the internal surface 368 of the casing 310 and the external surface 370 of the cartridge 312 is minimal such that the internal surface 368 of the casing 310 is substantially in contact with the exterior surface 370 of the cartridge 312 when the cartridge 312 is in position inside the casing 310. The seals 346, 348 and 350 are in sealing contact with the interior surface 368 of casing 310.

The inlet opening 320 and the outlet opening 324 of the cartridge 312 are provided at diametrically spaced locations of the main part 352 of the cartridge 312. In addition, the inlet opening 320 and the outlet opening 324 are longitudinally displaced, i.e. they are spaced apart in the longitudinal dimension of the main part 352 of the cartridge 312.

The seal 346 ensures that fluid that enters from the tubular members 330 of the casing 310 and the seal 348 ensures that fluid that exits from the outlet opening 324 of the cartridge 312 cannot leak from between the casing 310 and the cartridge 312, even though the gap between the internal surface 368 of the casing 310 and the external surface 370 of the cartridge 312 is minimal. In addition, the seal 350 prevents fluid that enters from the tubular members 330 from mixing together with fluid that exits from the outlet opening 324 of the cartridge 312 in the gap between the internal surface 368 of the casing 310 and the external surface 370 of the cartridge 312, even though the gap is minimal.

The cartridge 312 is retained in the casing 310 by suitable retention means.

In the valve 3, the retentions means is provided by a region 372 near the edge 333 of the casing 310 adjacent the access opening 326. The region 372 is rolled over to engage with a portion of the cartridge 312.

However, alternative forms of retention means may be provided. For example, in an alternative arrangement (not shown), the retention means may comprise a screw, fastening pin, or similar element engaging with the casing 310 and the cartridge 312. In another alternative arrangement, the retention means may comprise a fastening clip (for example, a circlip).

Third Embodiment (NRI)—Cartridge Components

The operational components of the valve 3 are contained in the cartridge 312. As previously stated herein, the valve 3 is a non-return isolating valve. The operational components of the valve 3 are contained within the cartridge 312, as best seen in FIGS. 5C, 5D, 5E and 7D, and will be now described.

The main part, or main body part, 352 of the cartridge 312 forms a housing for the operational components of the valve 3.

A valve member 376, a valve seat 377, a spring 378, a first cap 380 and a second cap 380a are provided in the main part 352 of the cartridge 312. The valve member 376 is provided with a seal 382. The valve seat 377 is formed by an annular extension 377a from the wall of the main part 352.

Figure 5C:
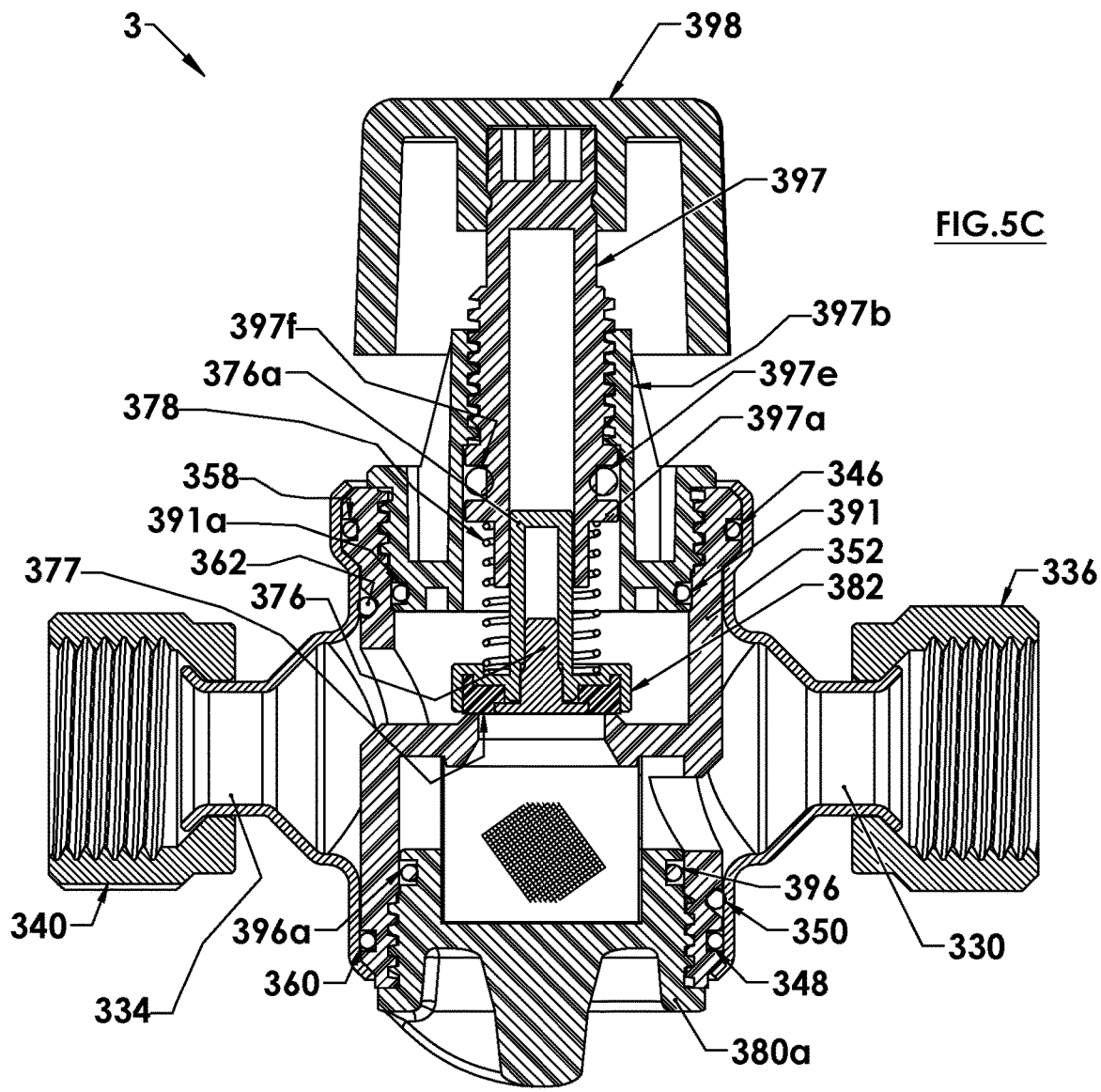
FIG. 5C is a first cross-sectional front view through the valve shown in FIG. 5A, with the valve in a closed condition.

The spring 378 biases the valve member 376 to seat on the valve seat 377 such that the seal 382 of the valve member 376 is in sealing contact with the valve seat 377. This is the closed condition of the valve 3 in which fluid is unable to flow through the valve 3. The closed condition of the valve 3 is shown in FIG. 5C. The cap 380 is attached to the main part 352 to retain the operational components of the valve 3 within the cartridge 312.

A seal 391 is provided between the cap 380 and the interior surface of the main part 352. The seal 391 is provided in a groove 391a formed in the cap 380. A further seal 396 is provided between the cap 380a and the interior surface of the main part 352. The seal 396 is provided in a groove 396a formed in the cap 380a. The seals 391 and 396 prevent fluid leaking from between the main part 352 of the cartridge 312 and the caps 380 and 380a to the exterior of the main part 352 of the cartridge 312.

The valve member 376 has a stem 376a, which is received in a spindle 397. The spring 378 is retained between the seal 382 of the valve member 376 and a flange 397a of the spindle 397. A spindle support 397b is provided in the cap 380 and extends from the cap 380 to the exterior of the main part 352 of the cartridge 312. The spindle 397 is provided within the spindle support 397b and the spindle 397 also extends to the exterior of the main part 352. The spindle 397 and the spindle support 397b are provided with respective screw threads 397c and 397d that engage. A dial 398 is provided at the end of the spindle 397 at the exterior of the main part 3352. The dial 398 can be turned to thereby turn the spindle 397 relative to the spindle support 397b via the engaging screw threads 397c and 397d.

A seal 397e is provided between the spindle 397 and the spindle support 397b. The seal 397e is provided in a groove 397f formed on the spindle 397.

A portion of the spindle 397, a portion of the spindle support 397b, a portion of the cap 380 and the dial 398 are located outside the casing 310. The region 372 near the edge 333 of the casing 310 adjacent the access opening 326 is rolled over to engage with a portion of the cartridge 312. The region 372 engages with a portion of the main part 352 of the cartridge 312 adjacent the edge 355.

Third Embodiment (NRI)—Use and Operation

The manner of use and operation of the valve 3 will now be described.

The use and operation of the valve 3 of the present invention is similar to that of non-return isolating valves of the prior art.

In use, the valve 3 may be connected to a pipe of a plumbing installation, such as a hot water system (not shown), using the lock nuts 336 and 340. The inlet opening 314 is connected to the upstream flow in the pipe and the outlet opening 318 is connected to the downstream flow.

The dial 398 may be turned to move the spindle 397 toward or away from the valve seat 377. For the normal operating condition of the valve 3, the dial 398 is turned such that the spindle 397 is moved to its position farthest from the valve seat 377, i.e. the spindle 397 is fully extended from the spindle support 397b. However, even in this position of the spindle 397, the spring 378 will bias the valve member 376 to seat on the valve seat 377, though with the minimum force. This condition of the spindle 397 is shown in FIG. 5C. If the dial 398 is turned to move the spindle 397 toward the valve seat 377, the spring 378 will bias the valve member 376 to seat on the valve seat 377 with greater force.

Figure 5D:
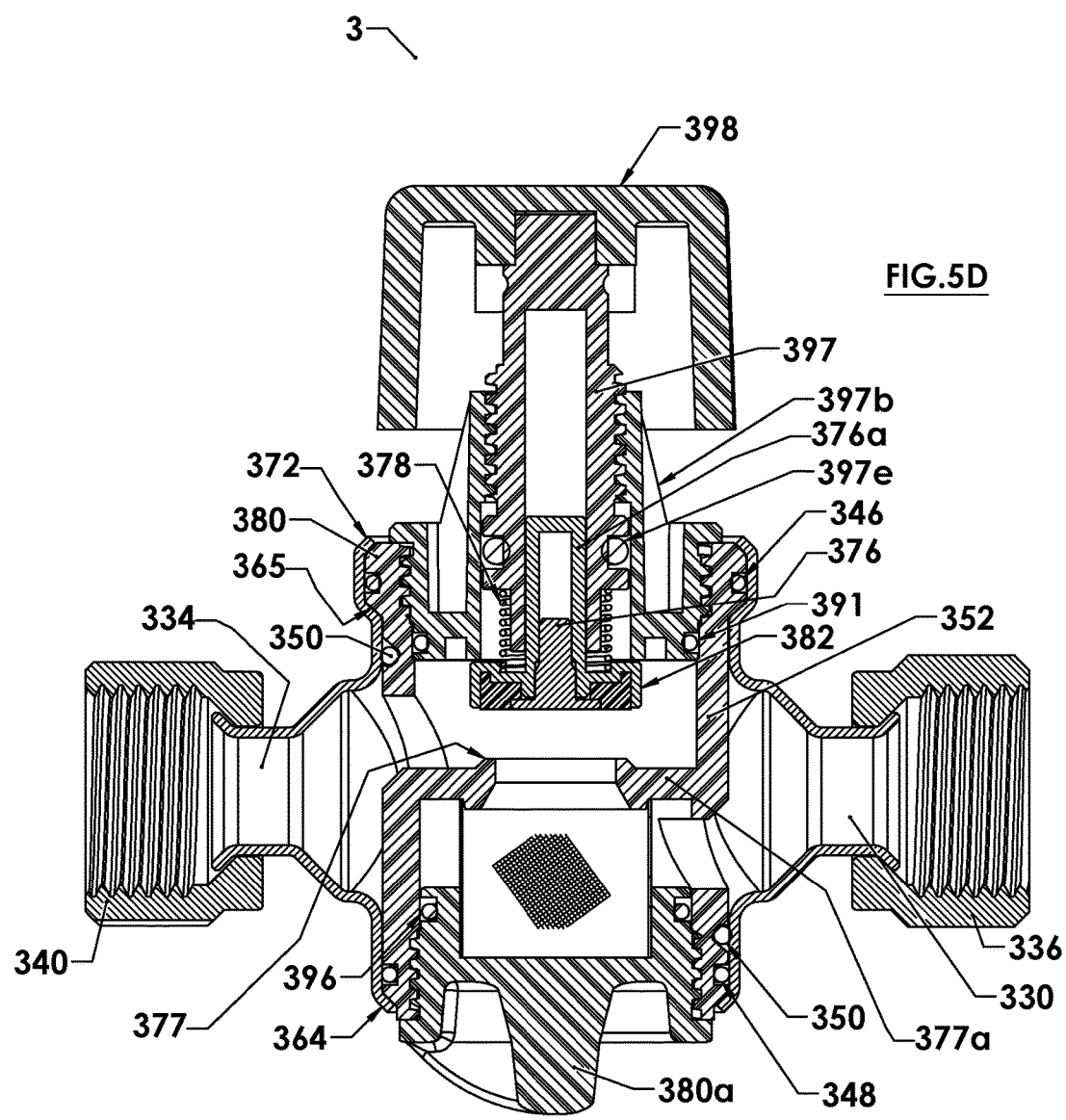
FIG. 5D is a second cross-sectional front view through the valve shown in FIG. 5A, with the valve in an open condition.

Flow of fluid, e.g. water, through the valve 3 may commence when a fluid outlet device such as, for example, a tap is opened downstream of the valve 3. When this occurs, water is able to enter the cartridge 312 from the tubular member 330, via the inlet opening 320 (as shown by the arrow K in FIG. 5D). The inflowing water unseats the valve member 376 from the valve seat 377, exposing the opening defined by the valve seat 377. This is the open condition of the valve 3 and is shown in FIG. 5D. The inflowing water flows through the opening, defined by the valve seat 377 (from which the seal 382 has been unseated), and then exits from the outlet opening 324 of the cartridge 312 and the outlet opening 318 of the casing 310 into the pipe of the plumbing installation on the downstream side of the valve 3.

Since the inlet opening 314 of the casing 310 and the inlet opening 320 of the cartridge 312 are in fluid communication and the outlet opening 318 of the casing 310 and the outlet opening 324 of the cartridge 312 are in fluid communication, a fluid flow path is created through the valve 3 from the inlet opening 314 of the casing 310, through the cartridge 312, to the outlet opening 318 of the casing 310, in the open condition of the valve 3. In the open condition of the valve 3, the valve member 376 is unseated from the valve seat 377 such that a fluid flow path is created from the inlet opening 320 of the cartridge 312, through the opening defined by the valve seat 377 (from which the valve member 376 is unseated), to the outlet opening 324 of the cartridge 312.

Flow of fluid through the valve 3 in the opposite direction, i.e. from the outlet opening 318 to the inlet opening 314 of the casing 310, is not possible because of the biasing action of the spring 378 which acts to seat the valve member 376 on the valve seat 377. In addition, fluid pressure on the downstream side of the valve member 376 also acts to seat the valve member 376 on the valve seat 377.

In the event that it becomes necessary to prevent flow of fluid through the valve 3, the dial 398 is turned such that the spindle 397 is moved toward the valve seat 377. This causes the spring 378 to compress and the valve member 376 to seat on the valve seat 377 with the seal 382 in sealing contact with the valve seat 377. This condition of the spindle 397 is shown in FIG. 5E. In this condition, the flow of fluid through the valve 3 ceases since the pressure of the fluid at the inlet opening 320 cannot unseat the valve member 376 from the valve seat 377. This effectively isolates the plumbing installation on the downstream side of the valve 3 and allows repairs and maintenance to components of the plumbing installation on the downstream side of the valve 3 to be performed.

Fourth Embodiment (PRV)—Description

In FIGS. 7A to 7C and FIGS. 8A to 8D, there is shown a fourth embodiment of a valve 4 in accordance with one aspect of the present invention. The valve 4 shown in these figures is of the pressure reducing valve (PRV) type.

The valve 4 comprises a casing 410 and a cartridge 412. The cartridge 412 is partly located in the casing 410. The cartridge 412 is provided with the operational components of the valve 4, as will be described later herein.

The casing 410 has an inlet opening 414 and an outlet opening 418. The inlet opening 414 forms the inlet opening for the valve 4, and the outlet opening 418 forms the outlet opening for the valve 4. The cartridge 412 is provided with an inlet opening 420 and an outlet opening 424.

The inlet opening 414 of the casing 410 is in fluid communication with the inlet opening 420 of the cartridge 412. The outlet opening 418 of the casing 410 is in fluid communication with the outlet opening 424 of the cartridge 412. The fluid communication of the respective inlet opening of the casing 410 and the cartridge 412 and the respective outlet opening of the casing 410 and the cartridge 412 is achieved by having the respective inlet and outlet openings aligned.

Figure 8A:
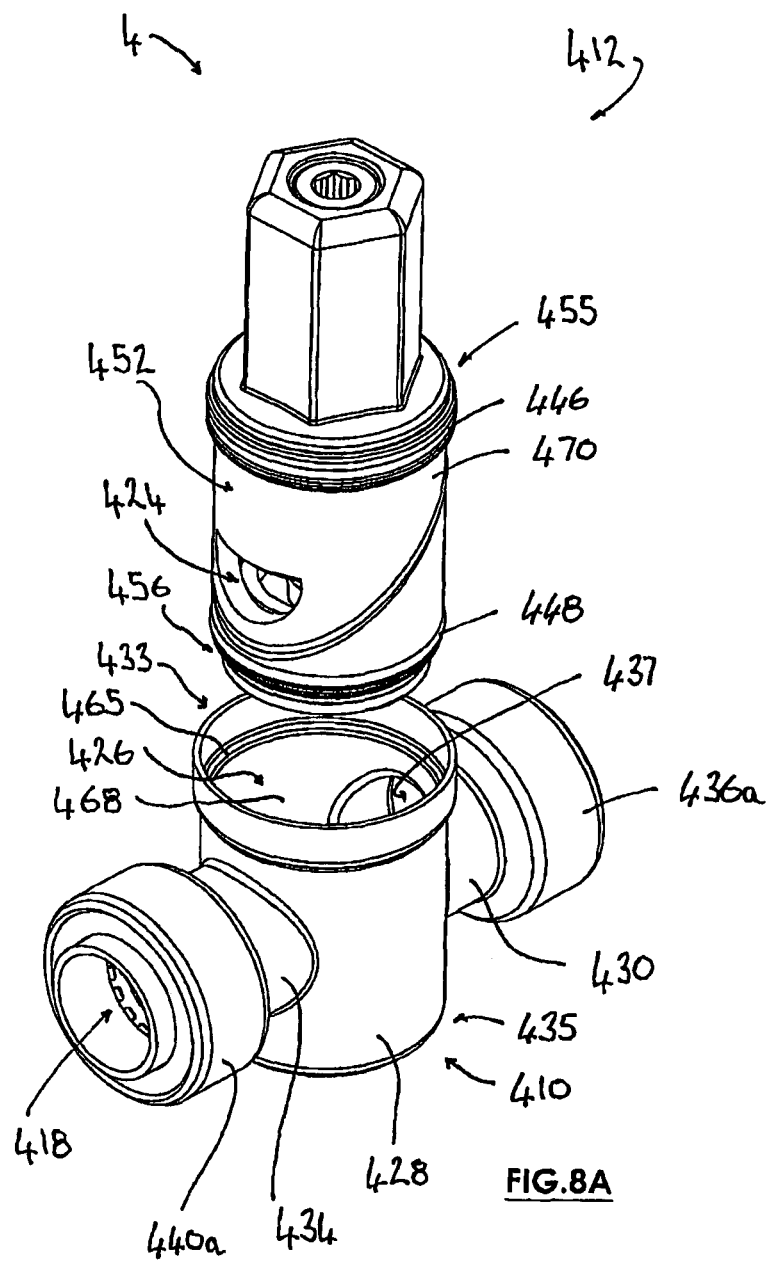
FIG. 8A is an exploded perspective view of the valve shown in FIG. 8A.

The casing 410 has an access opening 426 such that the cartridge 412 can be inserted into the casing 410 at the time of manufacture of the valve 4. The access opening 426 is best seen in FIG. 8A, which is an exploded view of the valve 4 showing the cartridge 412 located outside the casing 410.

The casing 410 comprises a main part, or main body portion, 428 and tubular members 430 and 434. The access opening 426 is provided at a first end 433 of the main part 428 of the casing 410. The tubular members 430 and 434 extend from the main part 428 as offset portions in an arm-like manner and in a diametrically opposed arrangement. In this way, the casing 410 is substantially T-shaped. The tubular members 430 and 434 are in fluid communication with the main part 428 of the casing 410. The main part 428 of the casing 410 accommodates the cartridge 412.

The casing 410 is provided with formations in the form of respective openings 437 between the main part 428 and the tubular members 430 and 434. The respective interiors of the main part 428 and the tubular members 430 and 434 are in communication via the respective openings 437.

Press-fit connectors 436a and 440a are provided at the distal ends of the tubular members 430 and 434 that are spaced from the main part 428. The press-fit connectors 436a and 440a enable the valve 4 to be connected to pipes in a plumbing installation (not shown) having screw threaded components, by way of screw threaded connections.

Seals 446, 448, and 450 are provided between the casing 410 and the cartridge 412. The seal 446 is provided near the access opening 426 of the casing 410. The seal 448 is provided at the region of the end of the main part 428, which is near the tubular member 434. The seal 450 extends around the cartridge 412 such that the inlet opening 420 and the outlet opening 424 are isolated from one another by the seal 450. The seal 450 extends around the cartridge 412 in a substantially elliptical manner from a location near the seal 446 to a location near the seal 448. The seals 446, 448 and 450 may be O-rings.

The cartridge 412 comprises a main part, or main body, 452 having respective ends 455 and 456.

The seals 446, 448 and 450 are located in respective grooves 458, 460 and 462 provided on the exterior of the main part 452 of the cartridge 412. The seals 446 and 448 and their respective grooves 458 and 460 are spaced apart and provided substantially near respective ends 455 and 456 of the main part 452 of the cartridge 412.

The main part 428 of the casing 410 is provided with an opening 457 at the end 435 of the main part 428. The opening 457 is opposed to the access opening 426, which is provided at the first end 433.

Figure 8B:
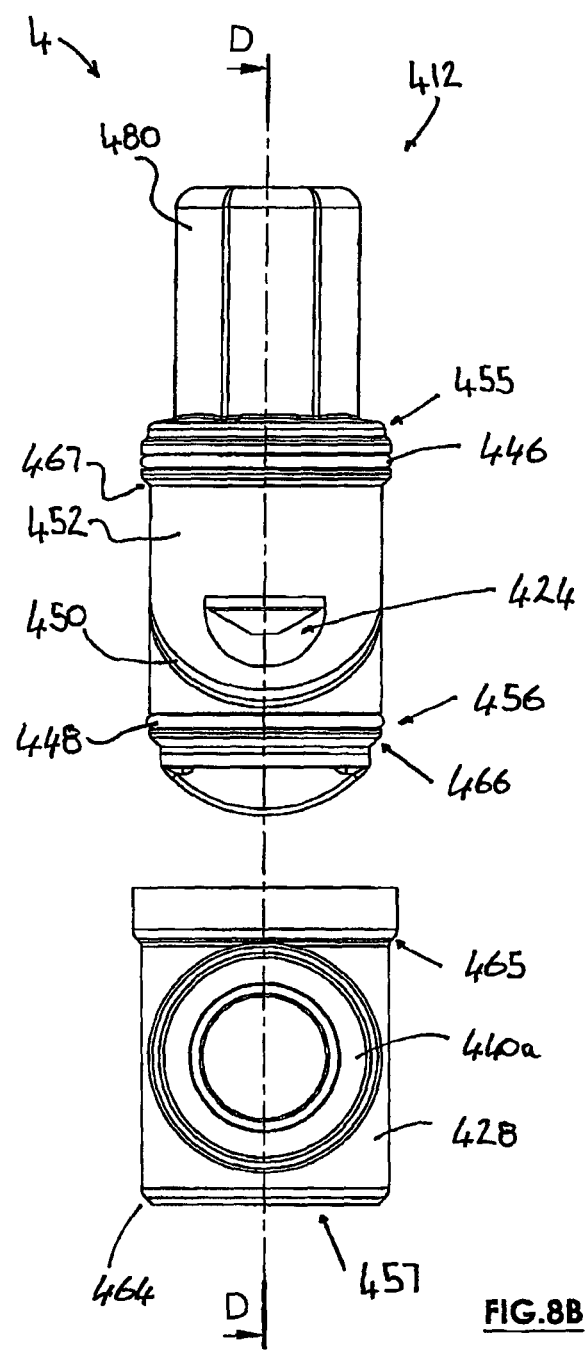
FIG. 8B is a side view of the valve shown in FIG. 7A.
Figure 8C:
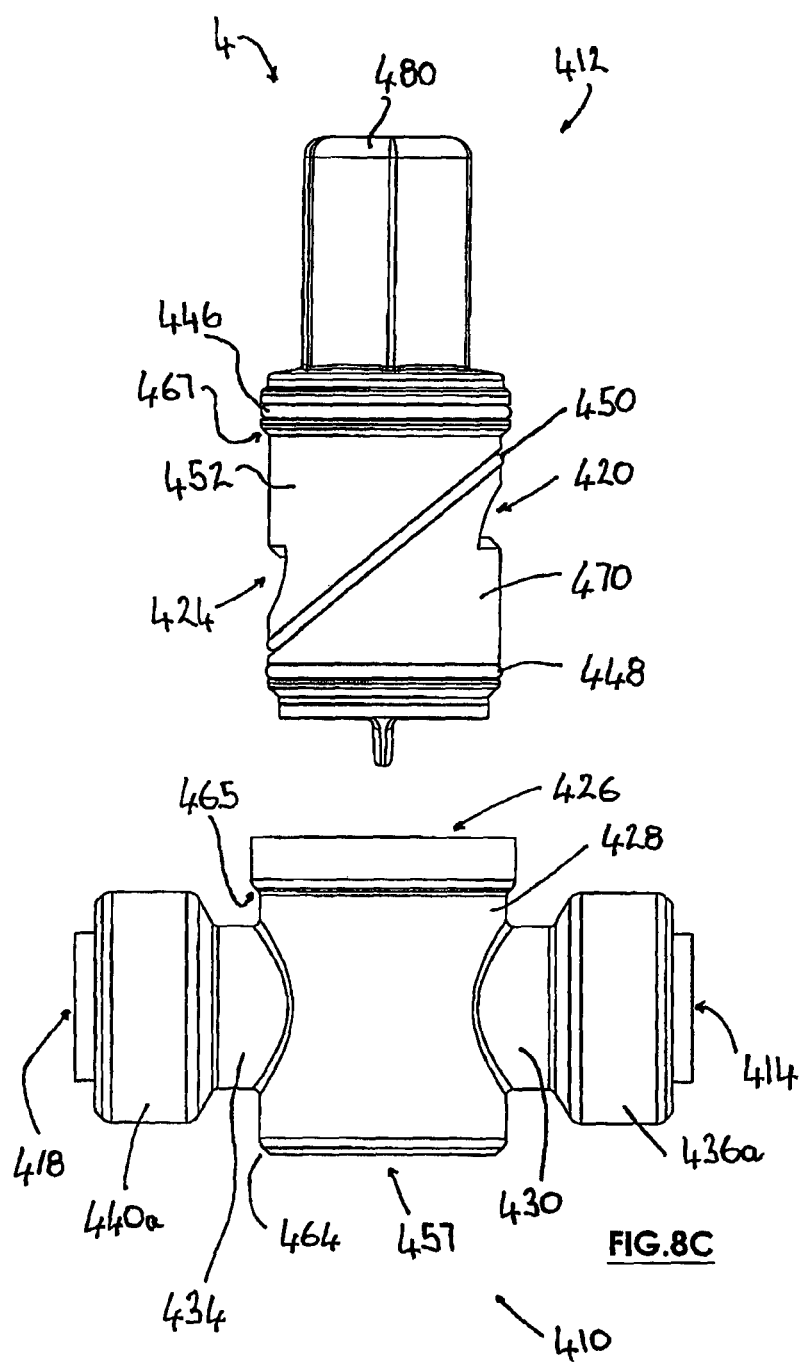
FIG. 8C is a front view of the valve shown in FIG. 7A.
Figure 8D:
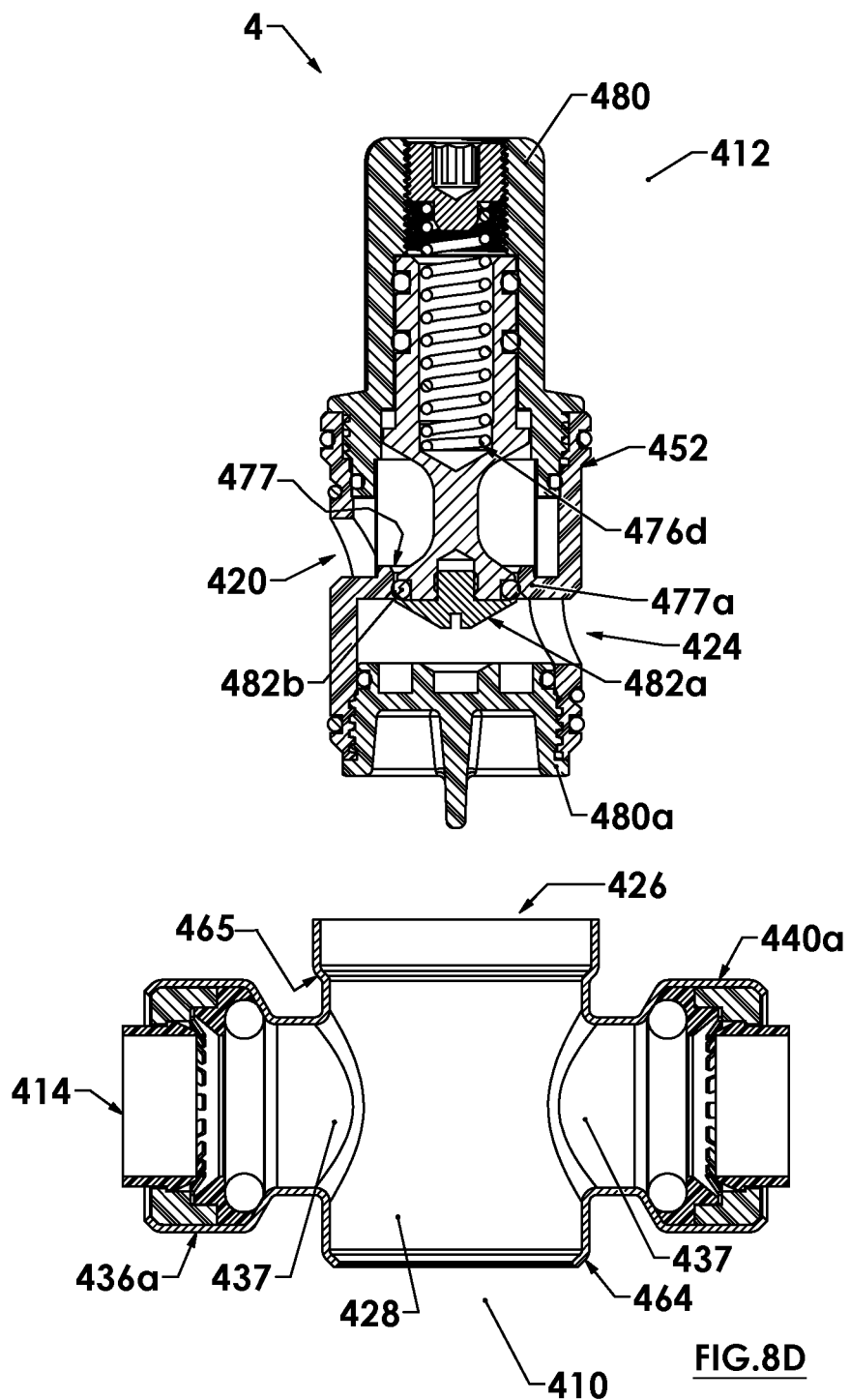
FIG. 8D is a cross-sectional front view taken along the line D-D in FIG. 8B.

The casing 410 is provided with a formation in the form of a shoulder 464 adjacent the end 435 of the main part 428 of the casing 410. The shoulder 464 is tapered so as to form an inwardly turned lip at the end 456, as best seen in FIGS. 8B to 8D, which surrounds the opening 457. The casing 410 is provided with another formation in the form of a shoulder 465 near the end 433.

The main part 452 of the cartridge 412 is provided with a shoulder 466 adjacent the end 456 of the main part 452. The shoulder 466 may be tapered, as best seen in FIGS. 8B to 8D. The main part 452 of the cartridge 412 is provided with another shoulder 467 near the end 455.

The shoulders 466 and 467 of the cartridge 412 sit on the shoulders 464 and 465, respectively, of the casing 410 inside the casing 410.

The casing 410 and the cartridge 412 are dimensioned such that the cartridge 412 can be inserted into the casing 410, via the access opening 426, during manufacture of the valve 4. However, the gap between the internal surface 468 of the casing 410 and the external surface 470 of the cartridge 412 is minimal such that the internal surface 468 of the casing 410 is substantially in contact with the exterior surface 470 of the cartridge 412 when the cartridge 412 is in position inside the casing 410. The seals 446, 448 and 450 are in sealing contact with the interior surface 468 of casing 410.

The inlet opening 420 and the outlet opening 324 of the cartridge 412 are provided at diametrically spaced locations of the main part 452 of the cartridge 412. In addition, the inlet opening 420 and the outlet opening 424 are longitudinally displaced, i.e. they are spaced apart in the longitudinal dimension of the main part 452 of the cartridge 412.

The seal 446 ensures that fluid that enters from the tubular members 430 of the casing 410 and the seal 448 ensures that fluid that exits from the outlet opening 424 of the cartridge 412 cannot leak from between the casing 410 and the cartridge 412, even though the gap between the internal surface 468 of the casing 410 and the external surface 470 of the cartridge 412 is minimal. In addition, the seal 450 prevents fluid that enters from the tubular members 430 from mixing together with fluid that exits from the outlet opening 424 of the cartridge 412 in the gap between the internal surface 468 of the casing 410 and the external surface 470 of the cartridge 412, even though the gap is minimal.

The cartridge 412 is retained in the casing 410 by suitable retention means.

In the valve 4, the retentions means is provided by a region 472 near the edge 433 of the casing 410 adjacent the access opening 426. The region 472 is rolled over to engage with a portion of the cartridge 412.

However, alternative forms of retention means may be provided. For example, in an alternative arrangement (not shown), the retention means may comprise a screw, fastening pin, or similar element engaging with the casing 410 and the cartridge 412. In another alternative arrangement, the retention means may comprise a fastening clip (for example, a circlip).

Fourth Embodiment (PRV)—Cartridge Components

Figure 7C:
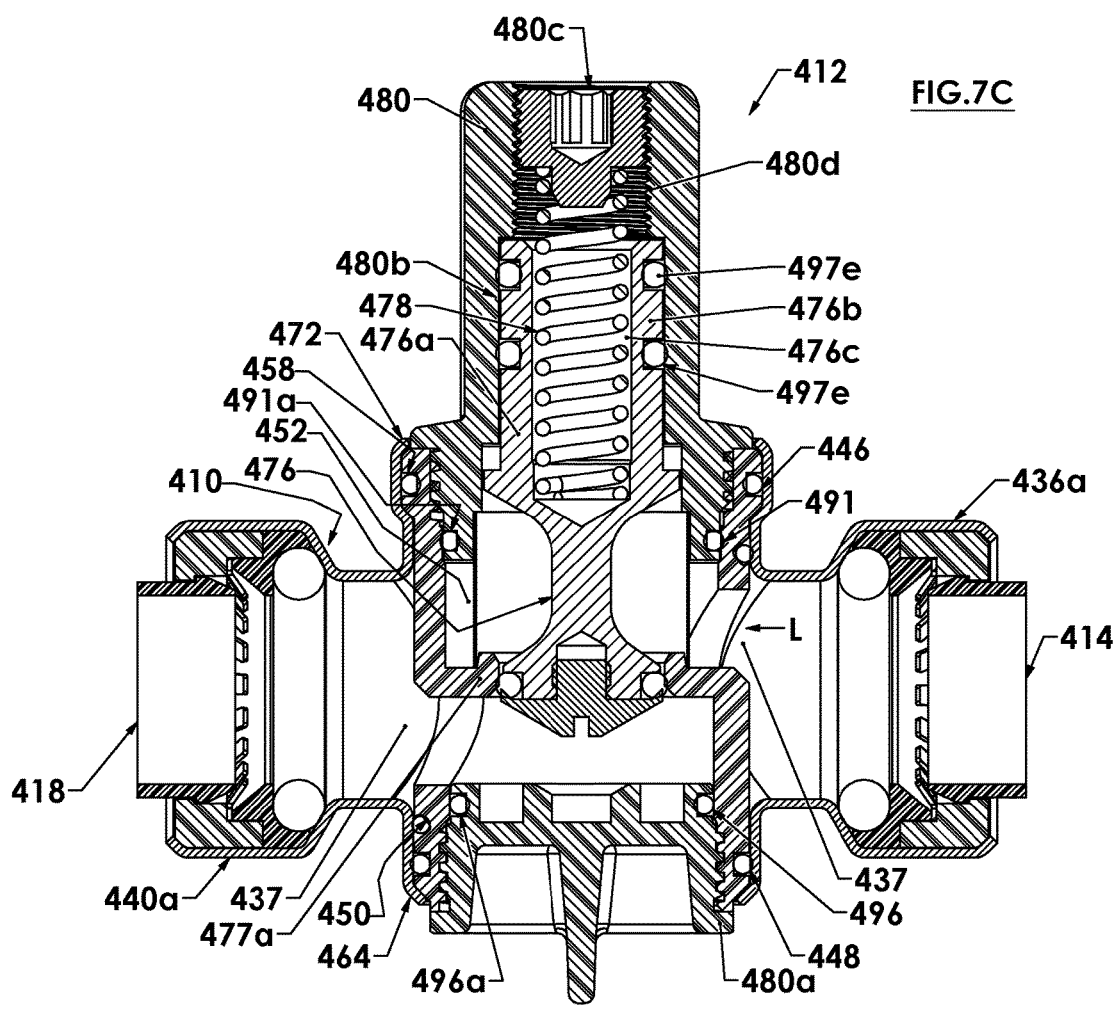
FIG. 7C is a first cross-sectional front view through the valve shown in FIG. 7A, with the valve in a closed condition.

The operational components of the valve 4 are contained in the cartridge 412. As previously stated herein, the valve 4 is a pressure reducing valve. The operational components of the valve 4 are contained within the cartridge 412, as best seen in FIGS. 7C and 8D, and will be now described.

The main part, or main body part, 452 of the cartridge 412 forms a housing for the operational components of the valve 4.

A valve member 476, a valve seat 477, a spring 478, a first cap 480 and a second cap 480a are provided in the main part 452 of the cartridge 412. The valve member 476 is provided with a valve head 482a having a seal 482b. The valve seat 477 is formed by an annular extension 477a from the wall of the main part 452. The cap 480 is attached to the main part 452 to retain the operational components of the valve 4 within the cartridge 412.

A seal 491 is provided between the cap 480 and the interior surface of the main part 452. The seal 491 is provided in a groove 491a formed in the cap 480. A further seal 496 is provided between the cap 480 and the interior surface of the main part 452. The seal 496 is provided in a groove 496a formed in the cap 480a. The seals 491 and 496 prevent fluid leaking from between the main part 452 of the cartridge 412 and the caps 480 and 480a to the exterior of the main part 452 of the cartridge 412.

The valve member 476 has a stem, or neck, 476a that extends from the valve head 482a to a base portion 476b. The base portion 476b of the valve member 476 is received in a chamber 480b in the cap 480. The base portion 476b has a chamber 476c that accommodates the spring 478. The spring 478 extends from the chamber 476c and is retained between an end wall 476d of the chamber 476c and a spring tension adjuster, which may be in the form of a screw 480c. The screw 480c is provided in the cap 480. The screw 480c engages with the a screw thread 480d in the cap 480.

Two seals 497e are provided between the base portion 476b and the wall of the chamber 480b. The seals 497e are provided in respective grooves 497f formed on the base portion 476b of the valve member 476. The seals 497e prevent fluid entering the chamber 476c that accommodates the spring 478.

The screw 480c and the portion of the cap 480 that accommodates the base portion 476b of the valve member 476 are located outside the casing 410. The region 472 near the edge 433 of the casing 410 adjacent the access opening 426 is rolled over to engage with a portion of the cartridge 412. The region 472 engages with a portion of the main part 452 of the cartridge 412 adjacent the edge 455.

Fourth Embodiment (PRV)—Use and Operation

The manner of use and operation of the valve 4 will now be described.

The use and purpose of the valve 4 of the present invention is similar to that of pressure reducing valves of the prior art. The valve 4 is used to reduce the pressure of fluid such that the maximum pressure of the fluid exiting the outlet opening 418 is reduced to a pre-set level. The pre-set maximum pressure level may be adjusted by turning the screw 480c in the appropriate direction to achieve the desired pre-set maximum pressure level.

In use, the valve 4 may be connected to a pipe of a plumbing installation, such as a hot water system (not shown), using the press-fit connectors 436a and 440a. The inlet opening 414 is connected to the upstream flow in the pipe and the outlet opening 418 is connected to the downstream flow.

Flow of fluid, e.g. water, through the valve 4 may commence when a fluid outlet device such as, for example, a tap is opened downstream of the valve 4. When this occurs, water is able to enter the cartridge 412 from the tubular member 430, via the inlet opening 420 (in the direction shown by the arrow L in FIG. 7C). The inflowing water acts on the valve head 482a and moves the valve member 476, in the direction toward the cap 480a, and unseats the seal 482b of the valve member 476 from the valve seat 477. This exposes the opening defined by the valve seat 477. The inflowing water flows through the opening, defined by the valve seat 477 (from which the seal 482b has been unseated), and then exits from the outlet opening 424 of the cartridge 412 and the outlet opening 418 of the casing 410 into the pipe of the plumbing installation on the downstream side of the valve 4.

Since the inlet opening 414 of the casing 410 and the inlet opening 420 of the cartridge 412 are in fluid communication and the outlet opening 418 of the casing 410 and the outlet opening 424 of the cartridge 412 are in fluid communication, a fluid flow path is created through the valve 4 from the inlet opening 414 of the casing 410, through the cartridge 412, to the outlet opening 418 of the casing 410, in the open condition of the valve 4. In the open condition of the valve 4, the valve member 476 is unseated from the valve seat 477 such that a fluid flow path is created from the inlet opening 420 of the cartridge 412, through the opening defined by the valve seat 477 (from which the valve member 476 is unseated), to the outlet opening 424 of the cartridge 412.

When the fluid flow device is closed, flow of water from the downstream side of the valve 4 ceases. The pressure on the upstream side and the downstream side of the valve 4 will reach an equilibrium and the valve member will move in the opposite direction such that the seal 482b again seats on the valve seat 477 to close the valve 4 such that fluid is unable to flow through the valve 4. The closed condition of the valve 4 is shown in FIG. 7C.

Flow of fluid through the valve 4 in the opposite direction, i.e. from the outlet opening 418 to the inlet opening 414 of the casing 410, is not possible because fluid pressure on the downstream side of the valve member 476 acts to seat the seal 482b of the valve member 476 on the valve seat 477 and thereby close the valve 4. Whilst lock nuts are used in some embodiments described herein as the connectors to connect the valves to a plumbing installation and press-fit connectors are used in other embodiments, it is to be understood that either of these connectors, or other suitable connectors, may be used in any of the embodiments described herein.

Fifth Embodiment (Ball Valve)—Description

Figure 9A:
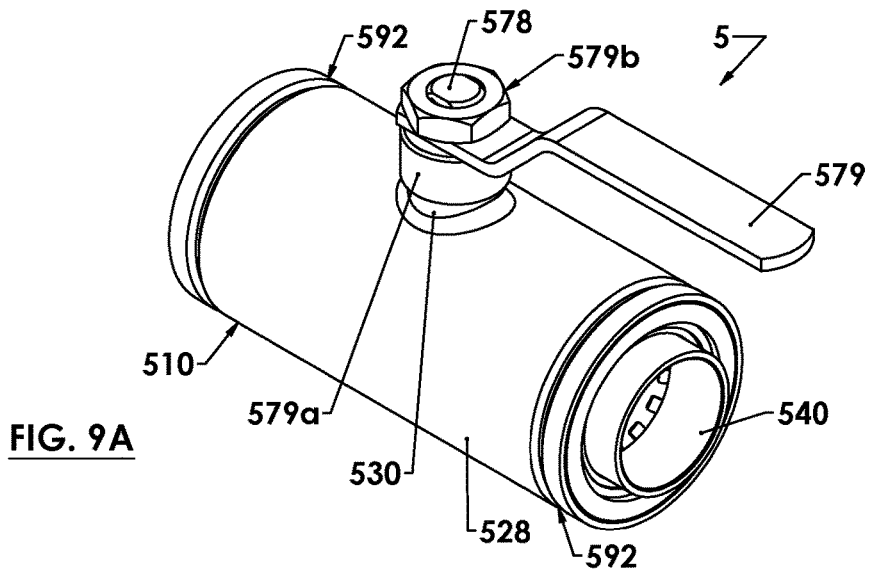
FIG. 9A is a first perspective view of a fifth embodiment of a device for a plumbing installation, in the form of a valve (being a ball valve), in accordance with an aspect of the present invention.
Figure 9B:
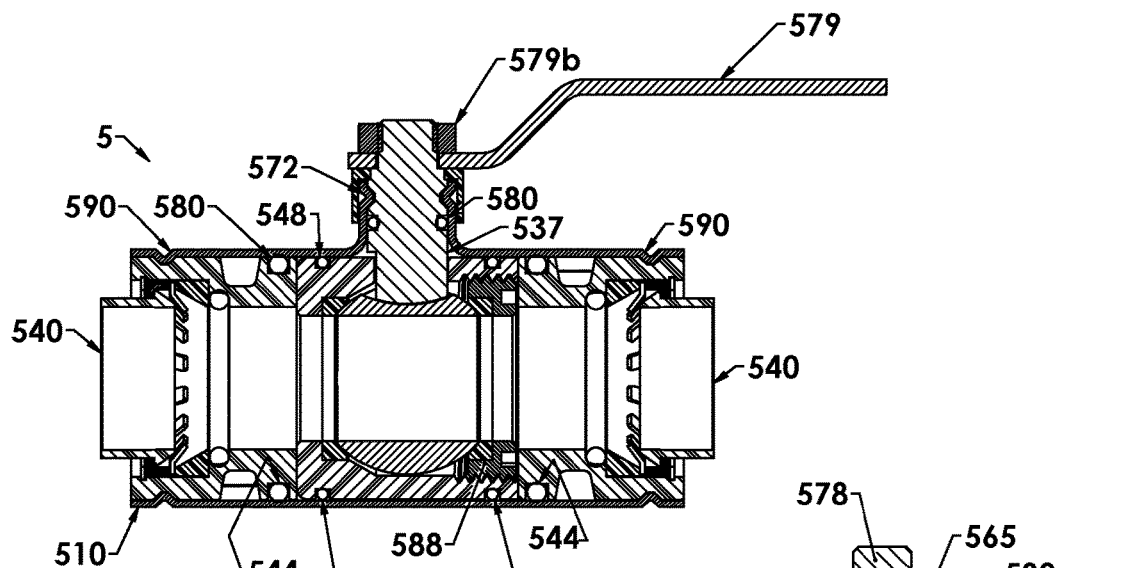
FIG. 9B is a cross-sectional side view of the valve shown in FIG. 9A.

In FIGS. 9A, 9B and 10, there is shown a fifth embodiment of a valve 5 in accordance with one aspect of the present invention. The valve 5 shown in these figures is of the ball valve type.

The valve 5 comprises a casing 510 and a cartridge 512. The cartridge 512 is partly located in the casing 510. The cartridge 512 is provided with the operational components of the valve 5 as will be described later herein.

The casing 510 has an inlet opening 514 and an outlet opening 518. The inlet opening 514 forms the inlet opening of the valve 5, and the outlet opening 518 forms the outlet opening of the valve 5. The cartridge 512 is provided with an inlet opening 520 and an outlet opening 524.

The inlet opening 514 of the casing 510 is in fluid communication with the inlet opening 520 of the cartridge 512. The outlet opening 518 of the casing 510 is in fluid communication with the outlet opening 524 of the cartridge 512. The fluid communication of the respective inlet opening of the casing 510 and the cartridge 512 and respective outlet opening of the casing 510 and the cartridge 512 is achieved by having the respective inlet and outlet openings aligned.

The cartridge 512 may be inserted into the casing 510 at the time of manufacture of the valve 5, via the inlet opening 514 or the outlet opening 518. This way, the inlet opening 514 or the outlet opening 518 forms an access opening for the cartridge 512 to be inserted into the casing 510.

The casing 510 comprises a main part, or main body part, 528 and a tubular member 530. The tubular member 530 extends from the main part 528 as an offset portion and has an opening 530a. The tubular member 530 is in communication with the main part 528 of the casing 510. The main part 528 of the casing 510 accommodates the cartridge 512.

The casing 510 is provided with a formation in the form of an opening 537 between the main part 528 and the tubular member 530. The respective interiors of the main part 528 and the tubular member 530 are in communication via the opening 537.

As with the other embodiments described herein, the valve 5 is provided with connectors such that the valve 5 can be connected into a plumbing installation. The connectors of the valve 5 are provided as connector cartridges 540. One connector cartridge 540 is provided adjacent the inlet opening 514 and another connector cartridge 540 is provided adjacent the outlet opening 518 in the casing 510. The connector cartridges 540 may be press-fit connectors, similar in operation to the connection fittings 240a of the valve 2 of the second embodiment. Each connector cartridge 540 is provided with a respective groove 542 and 544 adjacent each end. The connector cartridges 540 allow fluid to flow freely though them.

Seals 546 and 548 are provided between the casing 510 and the cartridge 512. The seals 546 and 548 may be O-rings.

The cartridge 512 comprises a main part, or main body, 552 having respective ends 555 and 556. The seals 546 and 548 are provided near respective ends 555 and 556 of the cartridge 512.

The seals 546 and 548 are located in respective grooves 558 and 560 provided on the exterior of the main part 552 of the cartridge 512. The seals 546 and 548 and the respective grooves 558 and 560 are spaced apart and provided substantially near respective ends 555 and 556 of the main part 552 of the cartridge 512.

A portion 565 of the cartridge 512 extends from the main part 552 of the cartridge 512 and is provided with grooves 566 and 567.

The casing 510 and the cartridge 512 are dimensioned such that the cartridge 512 can be inserted into the casing 510, via the inlet opening 514 or the outlet opening 518, during manufacture of the valve 5. However, the gap between the internal surface 568 of the casing 510 and the external surface 570 of the cartridge 512 is minimal such that the internal surface 568 of the cartridge 510 is substantially in contact with the external surface 570 of the cartridge 512 when the cartridge 512 is in position inside the casing 510. The seals 546 and 548 are in sealing contact with the internal surface 568 of the casing 510.

The seals 546 and 548 ensure that fluid that enters from the inlet opening 514 cannot leak between the casing 510 and the cartridge 512, even though the gap between the internal surface 568 of the casing 510 and the external surface 570 of the cartridge 512 is minimal.

The cartridge 512 is retained in the casing 510 by suitable retention means.

In the valve 5, the retention means is provided by a rolled formation 572 in the wall of the casing 510. The rolled formation 572 is located near the opening 530a of the tubular member 530. The rolled formation 572 is substantially circular. The rolled formation 572 is received in the groove 566 of the portion 565 of the cartridge 512. The rolled formation 572 is formed in the tubular member 530 of the casing 510 after the cartridge 512 has been installed in the casing 510.

However, alternative forms of retention means may be provided, for example, in an alternative arrangement (not shown) the retention means may comprise a screw, fastening pin, or similar element engaging with the casing 510 and the cartridge 512. In another alternative arrangement, the retention means may comprise a fastening clip (for example a circlip).

Fifth Embodiment (Ball Valve—Cartridge Components)

Figure 9C:
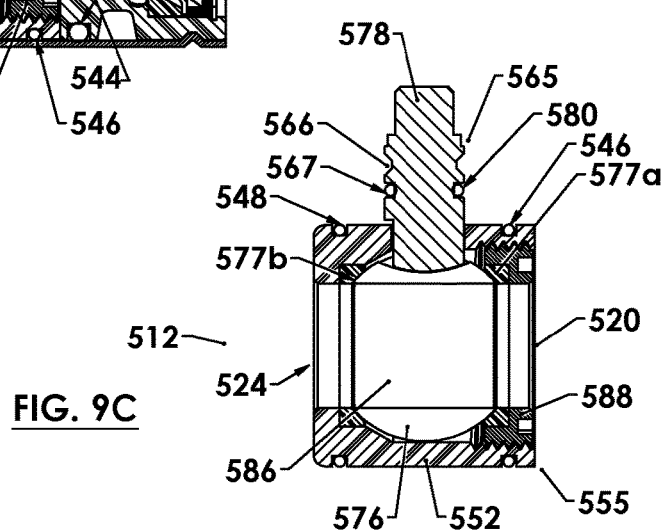
FIG. 9C is a cross-sectional view of the cartridge of the valve shown in FIG. 9A.

The cartridge 512 is provided with the operational components of the valve 5, as best seen in FIGS. 9B and 9C.

The main part, or main body part, 552 of the cartridge 512 forms the housing for the operational components of the valve 5.

The valve 5, being a ball valve, may be of conventional form for a ball valve. The valve 5 has a ball 576, valve seats 577a and 577b on respective sides of the ball 576, and a stem 578 extending from the ball 576. The stem 578 is housed in the portion 565 of the cartridge 512. A handle 579 is attached to the stem 578 by a collar 579a and a nut 579b, exterior of the valve 5. A bore 586 is provided in the ball 576.

The stem 578 extends inside the portion 565, which is received in the tubular member 530.

The ball 576 is retained in position in the cartridge 512 by a screw threaded collar 588.

The portion 565 is provided with a seal 580, such as an O-ring seal, in the groove 567. The seal 580 seals against the internal surface of the tubular portion 530 to prevent water leaking out from the opening 530a of the tubular member 530.

In manufacture of the valve 5, the cartridge 512 is installed in the casing 510 by inserting the main part 552 of the cartridge 512 into the main part 528 of the casing 510. The stem 578 is then attached to the ball 576, which is located in the main part 552 of the cartridge 512.

A respective seal 590, such as an O-ring seal, is provided in the grooves 544 of the connector cartridges 540.

The connector cartridges 540 are retained in the casing 510 by rolled formations 592 received in the grooves 542. The rolled formations 592 are formed in the casing 510 after the cartridge 512 and the connector cartridges 540 have been installed in the casing 510.

Fifth Embodiment (Ball Valve)—Use and Operation

The manner of use and operation of the valve 5 will now be described.

The use and operation of the valve 5 of the present invention is similar to that of conventional ball valves of the prior art. In that regard, the ball 576 has two operational positions. In the first, the ball 576 prevents flow of fluid from the inlet opening 520 to the outlet opening 524. In the second position, fluid is able to flow through the bore 586 in the ball 576. This second position is the open condition of the valve 5.

Since the inlet opening 514 of the casing 510 and the inlet opening 520 of the cartridge 512 are in fluid communication, and the outlet opening 518 of the casing 510 and the outlet opening 524 of the cartridge 512 are in fluid communication, in the open condition of the valve 5, a fluid flow path is created through the valve 5 from the inlet opening 514 of the casing 510, through the cartridge 512, to the outlet opening 518 of the casing 510. In the open condition of the valve 5, the ball 576 is oriented such that the ball in the ball 576 is aligned with the inlet opening 520 and the outlet opening 524 of the cartridge 512, such that a fluid flow path is thereby created.

Sixth Embodiment (Fluid Flow Meter)—Description

Figure 11A:
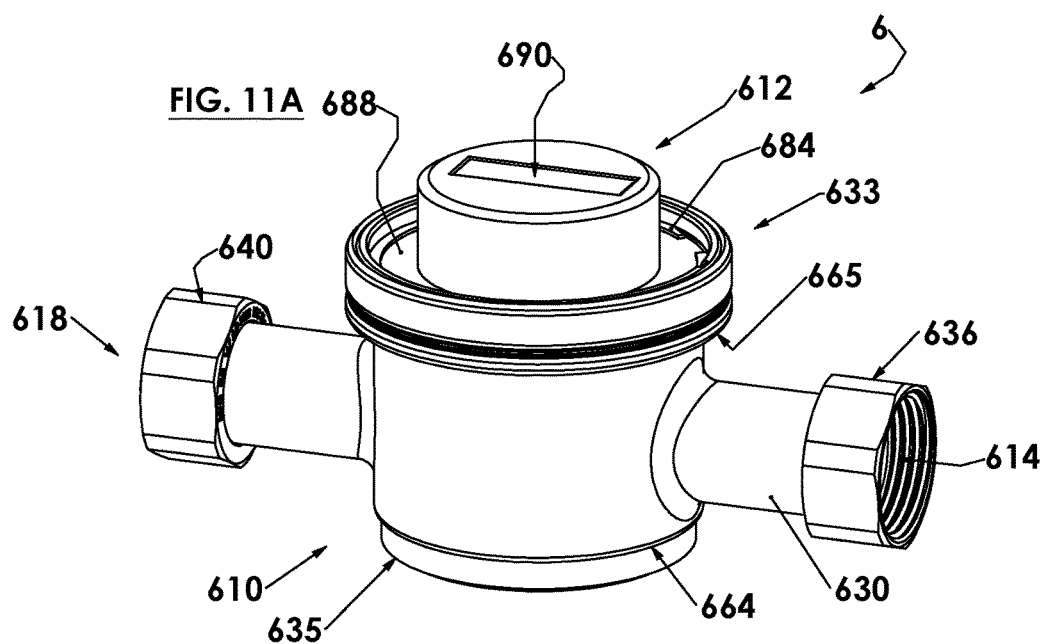
FIG. 11A is a first perspective view of a sixth embodiment of a device for a plumbing installation, in the form of a flow meter (being a water), in accordance with an aspect of the present invention.
Figure 11B:
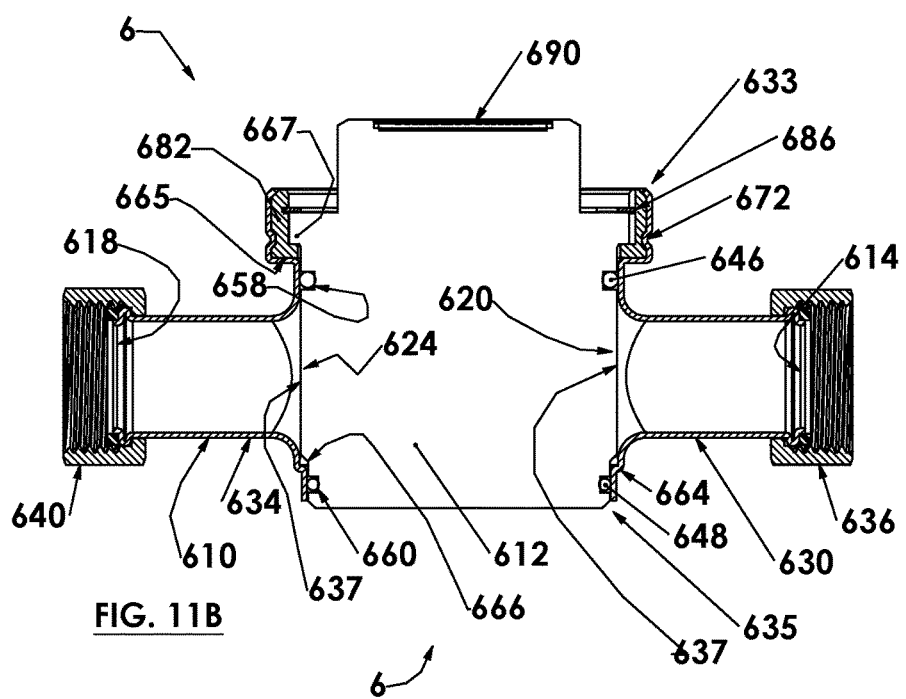
FIG. 11B is a cross-sectional side view of the valve shown in FIG. 11A.

In FIGS. 11A, 11B and 12, there is shown a sixth embodiment of a fluid flow meter 6 in accordance with one aspect of the present invention. The fluid flow meter 6, also referred to as a meter 6, that is shown in these figures may be a water flow meter.

The meter 6 comprises a casing 610 and cartridge 612. The cartridge 612 is partly located in the casing 610. The cartridge 612 is provided with the operational components of the meter 6 as will be described later herein.

The casing 610 has an inlet opening 614 and an outlet opening 618. The inlet opening 614 forms the inlet opening of the valve 6, and the outlet opening 618 forms the outlet opening of the valve 6. The cartridge 612 is provided with an inlet opening 620 and an outlet opening 624.

The inlet opening 614 of the casing 610 is in fluid communication with inlet opening 620 of the cartridge 612. The outlet opening 618 of the casing 610 is in fluid communication with the outlet opening 624 of the cartridge 612. The fluid communication of the respective inlet openings of the casing 610 and the cartridge 612 and respective outlet openings of the casing 610 and the cartridge 612 is achieved by having the respective inlet and outlet openings aligned.

The casing 610 has an access opening 626 such that the cartridge 612 can be inserted into the casing 610 at the time of manufacture of the meter 6.

The casing 610 comprises a main part, or main body portion, 628 and tubular member 630 and 634. The access opening 626 is provided at a first end 633 of the main part 628 of the casing 610. The tubular member 630 and 634 extend from the main part 628 as offset portions in an arm-like manner and in a diametrically opposed arrangement. The tubular member 630 and 634 are in fluid communication with the main part 628 of the casing 610. The main part 628 of the casing 610 accommodates the cartridge 612.

The casing 610 is provided with formations in the form of the respective openings 637 between the main part 628 and each of the tubular member 630 and 634. The respective interiors of the main part 628 and the tubular member 630 and 634 are in fluid communication via the respective openings 637.

Lock nut 636 and 640 are provided at the distal ends of the tubular member 630 and 634 that are spaced from the main part 628. The lock nuts 636 and 640 enable the meter 6 to be connected to pipes in the plumbing installation (not shown) having threaded components, by way of threaded connections.

Seals 646 and 648 are provided between the casing 610 and the cartridge 612. The seal 346 is provided near the access opening 626 of the casing 610. The seal 648 is provided at the region of the end 635 of the main part 628, which is spaced from the end 633. The seal 646 and 648 may be O-rings.

The cartridge 612 comprises a main part, or main body, 652 having respective ends 655 and 656.

The seal 646 and 648 are located in respective grooves 658 and 660 provided on the exterior of the main part 652 of the cartridge 612. The seals 646 and 648 and the respective grooves 658 and 660 are spaced apart and provided substantially near respective ends 655 and 656 of the main part 652 of the cartridge 612.

The main part 628 of the casing 610 is provided with an opening 657 at the end 635 of the main part 628. The opening 657 is opposed to the access opening 626, which is provided at the first end 633.

The casing 610 is provided with a formation in the form of shoulder 664 adjacent the end 635 of the main part 628 of the casing 610. The shoulder 664 is tapered so as to form a inwardly turned annular ledge near the end 656, of the casing 610, which surrounds the opening 657. The casing 610 is provided with another formation in the form of a shoulder 665 near the end 633. The shoulder 665 is provided as a substantially annular outwardly extending ledge.

The main part 652 of the cartridge 612 is provided with a shoulder 666 near the end 656 of the main part 652. The shoulder 666 may be tapered. The main part 652 of the cartridge 612 is provided with another shoulder 667 near the end 655.

The shoulder 666 of the cartridge 612 sits on the shoulders 664 of the casing 610, inside the casing 610.

The casing 610 and the cartridge 612 are dimensioned such that the cartridge 612 can be inserted into the casing 610, via the access opening 626, during manufacture of the meter 6. However, the gap between the internal surface 668 of the casing 610 and the external surface 670 of the cartridge 612 is minimal such that the internal surface 668 of the casing 610 is substantially in contact with the exterior surface 670 of the cartridge 612. When the cartridge 612 is in position inside the casing 610, the seals 646 and 648 are in sealing contact with internal surface 668 of the casing 610.

The inlet opening 620 and the outlet opening 624 of the cartridge 612 are provided at diametrically spaced locations of the main part 652 of the cartridge 612.

The seals 646 and 648 ensure that fluid that flows through the meter 6 cannot leak from between the casing 610 and the cartridge 612, even though the gap between the internal surface 668 of the casing 610 and the external surface 670 of the cartridge 612 is minimal.

The cartridge 612 is retained in a casing 610 by suitable retention means.

In the meter 6, the retention means is provided by a region 672 near the end 633 of the casing 610 adjacent the access opening 626. The region 672 is rolled inwardly to engage in a groove 680 of a retention ring 682. The region 672 is formed in the casing 610 after the cartridge 612 has been inserted into the casing 610 and the retention ring 682 placed in position. The retention ring 682 sits on the shoulder 665 of the casing 610 and the shoulder 667, of the cartridge 612, sits on the retention ring 682. The retention ring 682 is tightly wedged between the upper portion of the cartridge 612 and the casing 610. The retention ring 682 forms a first member that is provided between the casing 610 and the cartridge 612 and which is engaged by the casing 610. A circlip 684 is located in a groove 686 on the internal side of the retention ring 682 and bears against the upper surface 688 of the cartridge 612. The circlip 684 forms a second member that engages with the cartridge 612 and the retention ring 682.

However, alternative forms of retention means may be provided. For example, in an alternative arrangement (not shown) the retention means may comprise a screw, fastening pin or similar element engaging with the casing 610 and the cartridge 612.

Sixth Embodiment (Fluid Flow Meter)—Cartridge Components

The operational components of the meter 6 are contained in the cartridge 612. As previously stated herein, the meter 6 is a fluid flow meter, such as a water meter.

The main part, or main body part, 652 of the cartridge 612 forms the housing for the operational components of the meter 6.

The operational components of the meter 6 may be of conventional form. In that regard, whilst not illustrated in the drawings, the operational components of the cartridge 612 comprise a mechanism (for example, such as a turbine) to measure the flow of fluid passing through the cartridge 612 from the inlet opening 620 to the outlet opening 624 of the cartridge 612. The volume and/or flow rate of fluid flowing through the cartridge 612 is recorded by the meter 6 and shown on a display 690 at the top of the cartridge 612.

Sixth Embodiment (Fluid Flow Meter)—Use and Operation

The manner of use and operation of the meter 6 will now be described.

The meter 6 is installed in a plumbing installation in which the volume or flow rate of fluid flowing in the plumbing installation needs to be measured. For example, this may be a domestic plumbing installation whereby the relevant water authority is able to measure the volume of consumption of water at the domestic installation. The meter 6 measures and records the volume of water that passes through the cartridge 612 which is shown on the display 690.

The embodiments of the present invention have been described herein with various connectors. However, the connectors described are not necessarily unique to the particular embodiment in relation to which they have been described. Accordingly, connectors from one embodiment may be used as an alternative in any of the other embodiments to which they are suited. In addition, other suitable types of connectors may be used for the device of the present invention.

Whilst embodiments of the present invention have been herein before described, the scope of the present invention is not limited to those specific embodiments, and may be embodied in other ways, as will be apparent to a skilled addressee.

Modifications and variations such as would be apparent to a skilled addressee are deemed to be within the scope of the present invention.

What is claimed is:

1. A device for a plumbing installation comprising
    a casing comprising a wall surrounding a void interior, and the casing provided with one or more formations and at least one inlet opening and at least one outlet opening,
    a cartridge comprising a main body part with a first end and a second end, and the cartridge having at least two openings being a first opening and a second opening, and at least one of the first opening and the second opening being provided in the main body part of the cartridge between said first end and said second end,
    at least a first seal, a second seal, and a third seal provided between the casing and the cartridge,
    wherein the casing is a single piece casing hydraulically formed from a single piece of metal tubing into the shape required for the casing, and
    the cartridge is at least partly located in the void interior of the casing and is accommodated by the one or more formations of the casing, and the cartridge is provided with the operational components of the device, and
    wherein the casing comprises a third opening being an access opening for the cartridge, and the casing comprises a main body portion and at least one offset portion extending laterally from the main body portion, the casing being a single piece casing whereby the main body portion and the at least one offset portion together form the single piece casing,
    wherein the at least one inlet opening of the casing and the first opening of the cartridge are in fluid communication and the second opening of the cartridge and the at least one outlet opening of the casing are in fluid communication, in use, to create a fluid flow path through the device from the at least one inlet opening of the casing, through the cartridge via the first opening and the second opening of the cartridge, to the at least one outlet opening of the casing, and wherein the first seal and the second seal are provided at the exterior of the main body part of the cartridge, the first and second seals extending around the main body part of the cartridge such that they are positioned between the main body part of the cartridge and the inside surface of the casing, wherein the third seal extends around the main body part of the cartridge such that it is positioned between the main body part of the cartridge and the inside surface of the casing, and wherein the third seal extends around the main body part of the cartridge in an elliptical manner, and wherein fluid that enters the casing via the inlet is able to flow only into the first opening of the cartridge, and fluid that exits the cartridge via the second opening is able to flow only out of the outlet of the casing.

2. A device according to claim 1, wherein the one or more formations comprise one or more shoulders with which the cartridge abuts in the casing.

3. A device according to claim 1, wherein the one or more formations comprise one or more openings between the at least one offset portion and the main body portion of the casing such that respective void interiors of the at least one offset portion and the main body portion are in communication, and the one or more openings are provided during the hydraulic forming of the single piece of metal tubing to form the casing having a main body portion and at least one offset portion extending from the main body portion.

4. A device according to claim 1, wherein the cartridge is retained in the casing.

5. A device according to claim 4, wherein the cartridge is retained in the casing by a retention mechanism that comprises engagement between the casing and the cartridge, or engagement between the casing and a first member that is provided between the casing and the cartridge.

6. A device according to claim 4, wherein the cartridge is retained in the casing by at least one retention mechanism that comprises one or more selected from the following: a region of the casing being engaged with the cartridge; a screw, fastening pin, or other element engaging with the casing and the cartridge; or a fastening or securing clip.

7. A device according to claim 1, further comprising connection means to connect the device to a plumbing installation.

8. A device according to claim 1, wherein the device is a valve or fluid flow meter.

9. A device according to claim 1, wherein the access opening is opposed to the at least one outlet opening.

10. A device according to claim 1, wherein the main body part of the cartridge comprises a cylindrical shape.

11. A device according to claim 1, wherein the first and second seals are provided near the first and second ends, respectively, of the main body part of the cartridge.

12. A device according to claim 1, wherein the first opening and the second opening of the cartridge are provided in the main body part of the cartridge and are isolated from one another by the third seal.

13. A device according to claim 1, wherein the cartridge has a third opening, and the second opening and the third opening are provided in the main body part of the cartridge and are isolated from one another by the third seal.

14. A device according to claim 1, wherein first and second grooves are provided at the exterior of the main body part of the cartridge and the first and second seals are located in the first and second grooves, respectively.

15. A device according to claim 1, wherein a third groove is provided at the exterior of the main body part of the cartridge and extends around the main body part of the cartridge in an elliptical manner, and the third seal is located in the third groove.

16. A device for a plumbing installation comprising:
a casing comprising a wall surrounding a void interior, and the casing provided with one or more formations and at least one inlet opening and at least one outlet opening,
a cartridge comprising a main body part with a first end and a second end, and the cartridge having at least two openings being a first opening and a second opening, and at least one of the first opening and the second opening being provided in the main body part of the cartridge between said first end and said second end,
at least a first seal and a second seal provided between the casing and the cartridge,
wherein the casing is a single piece casing hydraulically formed from a single piece of metal tubing into the shape required for the casing, and
the cartridge is at least partly located in the void interior of the casing and is accommodated by the one or more formations of the casing, and the cartridge is provided with the operational components of the device, and
wherein the casing comprises a third opening being an access opening for the cartridge, and the casing comprises a main body portion and at least one offset portion extending laterally from the main body portion, the casing being a single piece casing whereby the main body portion and the at least one offset portion together form the single piece casing,
wherein the at least one inlet opening of the casing and the first opening of the cartridge are in fluid communication and the second opening of the cartridge and the at least one outlet opening of the casing are in fluid communication, in use, to create a fluid flow path through the device from the at least one inlet opening of the casing, through the cartridge via the first opening and the second opening of the cartridge, to the at least one outlet opening of the casing, and
wherein the first seal and the second seal are provided at the exterior of the main body part of the cartridge, the first and second seals extending around the main body part of the cartridge such that they are positioned between the main body part of the cartridge and the inside surface of the casing, and wherein the access opening is opposed to the at least one outlet opening, and wherein fluid that enters the casing via the inlet is able to flow only into the first opening of the cartridge, and fluid that exits the cartridge via the second opening is able to flow only out of the outlet of the casing.

* * * * *